United States Patent
Sato et al.

(10) Patent No.: US 9,785,041 B2
(45) Date of Patent: Oct. 10, 2017

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Shun Sato, Matsumoto (JP); Junichi Suzuki, Matsumoto (JP); Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/139,022

(22) Filed: Apr. 26, 2016

(65) Prior Publication Data

US 2016/0320693 A1 Nov. 3, 2016

(30) Foreign Application Priority Data

May 1, 2015 (JP) .................. 2015-094122
May 19, 2015 (JP) .................. 2015-101765

(51) Int. Cl.
*G03B 21/06* (2006.01)
*H04N 9/31* (2006.01)
(Continued)

(52) U.S. Cl.
CPC ....... *G03B 21/2053* (2013.01); *G03B 21/006* (2013.01); *G03B 21/2026* (2013.01);
(Continued)

(58) Field of Classification Search
CPC .................................. H04N 9/3155
(Continued)

(56) References Cited

U.S. PATENT DOCUMENTS 7,023,144 B2 4/2006 Suzuki et al.
8,269,424 B2 9/2012 Terashima
(Continued)

FOREIGN PATENT DOCUMENTS

JP 2006059790 A 3/2006
JP 2006156414 A 6/2006
(Continued)

OTHER PUBLICATIONS

Jul. 28, 2016 Extended Search Report issued in European Patent Application No. 16167408.0.

*Primary Examiner* — Paulos M Natnael
*Assistant Examiner* — Justin Sanders
(74) *Attorney, Agent, or Firm* — Oliff PLC

(57) ABSTRACT

A discharge lamp driving device includes a discharge lamp driving unit configured to supply a driving current to a discharge lamp including electrodes, a controller configured to control the discharge lamp driving unit, and a voltage detection unit configured to detect an inter-electrode voltage of the discharge lamp, in which the controller controls the discharge lamp driving unit so that the driving current includes a hybrid period in which a first period for supplying an AC current with a first frequency to the discharge lamp and a second period for supplying a DC current to the discharge lamp are alternately repeated, in which the first frequency includes a plurality of different frequencies, and in which the controller changes the first frequency on the basis of at least one of the detected inter-electrode voltage and driving power supplied to the discharge lamp.

28 Claims, 14 Drawing Sheets

(51) Int. Cl.
*G03B 21/20* (2006.01)
*G03B 21/00* (2006.01)
*H05B 41/38* (2006.01)
*H05B 41/288* (2006.01)

(52) U.S. Cl.
CPC ......... *H04N 9/3155* (2013.01); *H04N 9/3194* (2013.01); *H05B 41/2886* (2013.01); *H05B 41/2887* (2013.01); *H05B 41/38* (2013.01); *H04N 9/317* (2013.01); *H04N 9/3197* (2013.01); *Y02B 20/202* (2013.01)

(58) Field of Classification Search
USPC ....................................................... 348/751
See application file for complete search history.

(56) References Cited

U.S. PATENT DOCUMENTS

| | | |
|---|---|---|
| 8,324,828 B2 | 12/2012 | Yamamoto et al. |
| 8,378,581 B2 | 2/2013 | Terashima |
| 8,400,068 B2 | 3/2013 | Terashima |
| 8,513,893 B2 | 8/2013 | Ono et al. |
| 9,030,111 B2 | 5/2015 | Imamura et al. |
| 2005/0206326 A1 | 9/2005 | Suzuki et al. |
| 2011/0012524 A1 | 1/2011 | Terashima |
| 2011/0012525 A1 | 1/2011 | Terashima |
| 2011/0018456 A1 | 1/2011 | Terashima |
| 2011/0063584 A1* | 3/2011 | Hirao ................. H05B 41/2883 353/85 |
| 2011/0210680 A1 | 9/2011 | Yamamoto et al. |
| 2012/0074858 A1* | 3/2012 | Ono ................... H05B 41/2883 315/209 R |
| 2012/0313546 A1 | 12/2012 | Imamura et al. |
| 2015/0201481 A1 | 7/2015 | Fukuda et al. |

FOREIGN PATENT DOCUMENTS

| | | |
|---|---|---|
| JP | 1416125 B2 | 2/2010 |
| JP | 2011-023288 A | 2/2011 |
| JP | 2011-028943 A | 2/2011 |
| JP | 2011023154 A | 2/2011 |
| JP | 2011-124184 A | 6/2011 |
| JP | 2011-210564 A | 10/2011 |
| JP | 2011210565 A | 10/2011 |
| JP | 5278212 B2 | 9/2013 |
| JP | 5313932 B2 | 10/2013 |
| JP | 5333762 B2 | 11/2013 |
| JP | 5333764 B2 | 11/2013 |
| JP | 2014-032760 A | 2/2014 |
| JP | 5494120 B2 | 5/2014 |
| JP | 5625438 B2 | 11/2014 |
| WO | 2006/051926 A1 | 5/2006 |

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source apparatus, a projector, and a discharge lamp driving method.

2. Related Art

For example, JP-A-2011-124184 discloses a configuration in which a frequency of an AC current supplied to a high pressure discharge lamp switches between a first frequency and a second frequency higher than the first frequency.

For example, in JP-A-2011-124184, a period is provided in which an AC current with the first frequency is supplied to the high pressure discharge lamp in a length of half a cycle in order to suppress wearing of an electrode tip. However, in this method, for example, there is a problem in that wearing of the electrode tip cannot be sufficiently suppressed with the progress of deterioration in the high pressure discharge lamp. Therefore, there is a problem in that a service life of the high pressure discharge lamp cannot be sufficiently improved.

SUMMARY

An advantage of some aspects of the invention is to provide a discharge lamp driving device capable of improving a service life of a discharge lamp, a light source apparatus having the discharge lamp driving device, and a projector having the light source apparatus. Another advantage of some aspects of the invention is to provide a discharge lamp driving method capable of improving a service life of a discharge lamp.

An aspect of the invention is directed to a discharge lamp driving device including a discharge lamp driving unit configured to supply a driving current to a discharge lamp including electrodes; a controller configured to control the discharge lamp driving unit; and a voltage detection unit configured to detect an inter-electrode voltage of the discharge lamp, in which the controller controls the discharge lamp driving unit so that the driving current includes a hybrid period in which a first period for supplying an AC current with a first frequency to the discharge lamp and a second period for supplying a DC current to the discharge lamp are alternately repeated, in which the first frequency includes a plurality of different frequencies, and in which the controller changes the first frequency on the basis of at least one of the detected inter-electrode voltage and driving power supplied to the discharge lamp.

For example, in a case where the discharge lamp deteriorates and thus an inter-electrode voltage increases and driving power is reduced, driving current supplied to the discharge lamp is reduced. Thus, a bright spot in arc discharge tends to be unstable and to be moved. If the bright spot in arc discharge is moved, a melting position and a melting amount in the electrode change. Consequently, there is a concern that a shape of the electrode may become unstable and may thus be likely to wear. Therefore, there is a concern that a service life of the discharge lamp may not be sufficiently improved.

In contrast, according to the aspect of the discharge lamp driving device of the invention, the controller sets the first frequency on the basis of at least one of the inter-electrode voltage and the driving power. Thus, if the first frequency is set to become higher as the driving current is reduced, a bright spot in arc discharge can be easily stabilized. Consequently, it is possible to prevent the electrode from wearing and thus to improve a service life of the discharge lamp.

The first frequency includes a plurality of different frequencies, and thus it is possible to change a thermal load applied to the electrode in the first period. Therefore, it is easy to maintain a shape of the protrusion of the electrode.

The controller may set the first frequency on the basis of the detected inter-electrode voltage, and the first frequency may be set to become higher as the inter-electrode voltage increases.

With this configuration, a bright spot in arc discharge can be easily stabilized in a case where the discharge lamp deteriorates.

The controller may set the first frequency on the basis of the driving power, and the first frequency may be set to become higher as the driving power is reduced.

With this configuration, a bright spot in arc discharge can be easily stabilized in a case where the driving power is reduced.

The first period may include a plurality of AC periods in which frequencies of the AC current supplied to the discharge lamp are different from each other, and the frequency of the AC current in the AC period may become lower as the AC period is provided temporally later in the first period.

With this configuration, it is possible to further increase a variation in a thermal load applied to the electrode during switching between the first period and the second period.

The controller may change a length of the second period on the basis of at least one of the detected inter-electrode voltage and the driving power.

With this configuration, it is easy to maintain a shape of the protrusion of the electrode even in a case where the discharge lamp deteriorates. In addition, with this configuration, it is possible to easily prevent a thermal load applied to the electrode from being excessively increased.

The discharge lamp driving device may be configured such that, in a case where the detected inter-electrode voltage is higher than a first predetermined value, or the driving power supplied to the discharge lamp is lower than a second predetermined value, the controller controls the discharge lamp driving unit so that a third period is provided instead of the second period, the third period alternately includes a first DC period in which a DC current is supplied to the discharge lamp, and a second DC period in which a DC current with a polarity opposite to a polarity of the DC current supplied to the discharge lamp in the first DC period is supplied to the discharge lamp, a length of the first DC period is longer than a length of the second DC period, and the length of the second DC period is less than 0.5 ms.

With this configuration, in a case where the detected inter-electrode voltage is more than the first predetermined value, or the driving power supplied to the discharge lamp is less than the second predetermined value, the third period including the first DC period and the second DC period in which polarities are different from each other is provided. Thus, when one electrode is heated, the temperature of the other electrode can be prevented from being excessively lowered.

Another aspect of the invention is directed to a discharge lamp driving device including a discharge lamp driving unit configured to supply a driving current to a discharge lamp including electrodes; and a controller configured to control the discharge lamp driving unit, in which the controller controls the discharge lamp driving unit to provide a hybrid period in which a first period for supplying an AC current with a first frequency to the discharge lamp and a second period for supplying a DC current to the discharge lamp are alternately repeated, a fourth period in which an AC current with a second frequency lower than the first frequency is supplied to the discharge lamp, and a fifth period alternately including a third DC period in which a DC current is supplied to the discharge lamp, and a fourth DC period in which a DC current with a polarity opposite to a polarity of the DC current supplied to the discharge lamp in the third DC period is supplied to the discharge lamp, in which a length of the third DC period is longer than a length of the fourth DC period, in which the length of the fourth DC period is less than 0.5 ms, and in which a total of the lengths of the third DC periods in the fifth period is longer than a length of the second period, and is longer than a length of half a cycle of the AC current with the second frequency in the fourth period.

According to the discharge lamp driving device of the aspect of the invention, the fourth period and the fifth period are provided in addition to the hybrid period in which the first period for supplying an AC current to the discharge lamp and the second period for supplying a DC current to the discharge lamp are alternately repeated. In the fourth period, the AC current with the second frequency lower than the first frequency of the AC current in the first period is supplied to the discharge lamp. Thus, a thermal load applied to the electrode is increased in the fourth period more than in the first period.

The third DC period and the fourth DC period are provided in the fifth period, and a total of the lengths of the third DC periods in the fifth period is longer than a length of the second period, and is longer than a length of half a cycle of the AC current with the second frequency. Thus, a thermal load applied to the electrode is increased in the fifth period more than in the second period.

Consequently, since the fourth period and the fifth period are provided, it is possible to increase a variation in a thermal load applied to the electrode and thus to prompt growth of the protrusion of the electrode. Therefore, according to the discharge lamp driving device of the aspect of the invention, it is possible to easily maintain a shape of the protrusion and to improve a service life of the discharge lamp.

The length of the third DC period may be ten times or more the length of the fourth period.

With this configuration, it is possible to appropriately heat the electrode in the fifth period.

The total of the lengths of the third DC periods in the fifth period may be equal to or larger than 10 ms and equal to or less than 1.0 s.

With this configuration, it is possible to appropriately heat the electrode in the fifth period.

The discharge lamp driving device may be configured such that a plurality of the hybrid periods are provided, and the fifth period is provided between the hybrid periods which are temporally adjacent to each other, and is provided immediately after the first period.

With this configuration, it is easy to provide the fifth period at an appropriate interval and to maintain a shape of the protrusion.

The discharge lamp driving device may be configured such that a plurality of the hybrid periods are provided, and the fourth period is provided between the hybrid periods which are temporally adjacent to each other, and is provided immediately after the first period.

With this configuration, it is easy to provide the fourth period at an appropriate interval and to maintain a shape of the protrusion.

The controller may control the discharge lamp driving unit so that one of the fourth period and the fifth period is provided at a first predetermined interval.

With this configuration, it is easy to provide the fourth period and the fifth period at appropriate intervals, and it becomes easier to maintain a shape of the protrusion.

The controller may control the discharge lamp driving unit so that the fourth period is provided at a second predetermined interval larger than the first predetermined interval.

With this configuration, it is easy to make a frequency at which the fourth period is provided lower than a frequency at which the fifth period is provided, and thus it is possible to more appropriately vary a thermal load to the electrode.

The controller may control the discharge lamp driving unit to provide, in the second predetermined interval, the fifth period alternately including the third DC period in which a DC current with a first polarity is supplied to the discharge lamp, and the fourth DC period in which a DC current with a second polarity is supplied to the discharge lamp; and the fifth period alternately including the third DC period in which a DC current with the second polarity is supplied to the discharge lamp, and the fourth DC period in which a DC current with the first polarity is supplied to the discharge lamp.

With this configuration, the fifth periods in which polarities of driving current supplied to the discharge lamp are opposite to each other are provided between the fourth periods which are temporally adjacent to each other. Consequently, it is possible to make protrusions of two electrodes grow with good balance.

The first frequency may include a plurality of different frequencies.

With this configuration, it is possible to change a thermal load applied to the electrode in the first period, and thus it is easy to maintain a shape of the electrode.

The first period may include a plurality of AC periods in which frequencies of the AC current supplied to the discharge lamp are different from each other, and the frequency of the AC current in the AC period may become lower as the AC period is provided temporally later in the first period.

With this configuration, it is possible to further increase a variation in a thermal load applied to the electrode during switching between the first period and the second period.

A polarity of the DC current supplied to the discharge lamp in the third DC period and a polarity of the DC current supplied to the discharge lamp in the fourth DC period may be inverted whenever the fifth period is provided.

With this configuration, it is easy to maintain shapes of the protrusions of both of the two electrodes.

A starting polarity of the fourth period may be inverted whenever the fourth period is provided.

With this configuration, it is easy to maintain shapes of the protrusions of both of the two electrodes.

A polarity of the DC current supplied to the discharge lamp in the second period of the hybrid period may be inverted whenever the second period is provided.

With this configuration, it is easy to maintain shapes of the protrusions of both of the two electrodes.

The discharge lamp driving device may further include a voltage detection unit configured to detect an inter-electrode voltage of the discharge lamp, and the controller may change the total of the lengths of the third DC periods in the fifth period on the basis of at least one of the detected inter-electrode voltage and driving power supplied to the discharge lamp.

With this configuration, it is easy to maintain a shape of the protrusion of the electrode even in a case where the discharge lamp deteriorates. In addition, with this configuration, it is possible to easily prevent a thermal load applied to the electrode from being excessively increased.

The discharge lamp driving device may be configured such that the controller sets the total of the lengths of the third DC periods in the fifth period on the basis of the detected inter-electrode voltage, and the total of the lengths of the third DC periods in the fifth period is set to become longer as the inter-electrode voltage increases.

With this configuration, it is easy to maintain a shape of the protrusion of the electrode even in a case where the discharge lamp deteriorates.

The discharge lamp driving device may be configured such that the controller sets the total of the lengths of the third DC periods in the fifth period on the basis of the driving power, and the total of the lengths of the third DC periods in the fifth period is set to become shorter as the driving power increases.

With this configuration, it is possible to easily prevent a thermal load applied to the electrode from being excessively increased.

The discharge lamp driving device may further include a voltage detection unit configured to detect an inter-electrode voltage of the discharge lamp, and the controller changes a length of the second period on the basis of at least one of the detected inter-electrode voltage and driving power supplied to the discharge lamp.

With this configuration, it is easy to maintain a shape of the protrusion of the electrode even in a case where the discharge lamp deteriorates. In addition, with this configuration, it is possible to easily prevent a thermal load applied to the electrode from being excessively increased.

The discharge lamp driving device may be configured such that the discharge lamp driving device includes a voltage detection unit configured to detect an inter-electrode voltage of the discharge lamp; in a case where the detected inter-electrode voltage is higher than a first predetermined value, or the driving power supplied to the discharge lamp is lower than a second predetermined value, the controller controls the discharge lamp driving unit so that a third period is provided instead of the second period; the third period alternately includes a first DC period in which a DC current is supplied to the discharge lamp, and a second DC period in which a DC current with a polarity opposite to a polarity of the DC current supplied to the discharge lamp in the first DC period is supplied to the discharge lamp; a length of the first DC period is longer than a length of the second DC period; wherein the length of the second DC period is less than 0.5 ms; and the total of the lengths of the third DC periods in the fifth period is longer than a total of the lengths of the first DC periods in the third period.

With this configuration, in a case where a length of the second period is set to be long, the third period including the first DC period and the second DC period in which polarities supplied to the discharge lamp are different from each other is provided. Thus, when one electrode is heated, the temperature of the other electrode can be prevented from being excessively lowered.

The total of the lengths of the first DC periods in the third period may be equal to or larger than 5.0 ms and equal to or less than 100 ms.

With this configuration, it is possible to appropriately heat the electrode in the first period.

The length of the fourth period may be a length of 6 or more cycles and 30 or less cycles of the AC current with the second frequency.

With this configuration, it is possible to easily control a shape of the protrusion of the electrode in the fourth period.

Still another aspect of the invention is directed to a light source apparatus including a discharge lamp configured to emit light; and the discharge lamp driving device.

According to the light source apparatus of the aspect of the invention, the discharge lamp driving device is provided, and thus it is possible to improve a service life of the discharge lamp.

Yet another aspect of the invention is directed to a projector including the light source apparatus; a light modulation device configured to modulate light emitted from the light source apparatus according to an image signal; and a projection optical system configured to project light modulated by the light modulation device.

According to the projector of the aspect of the invention, the light source apparatus is provided, and thus it is possible to improve a service life of the discharge lamp.

Still yet another aspect of the invention is directed to a discharge lamp driving method for supplying a driving current to a discharge lamp including electrodes and driving the discharge lamp, the method including supplying the driving current including a hybrid period in which a first period for supplying an AC current with a first frequency to the discharge lamp and a second period for supplying a DC current to the discharge lamp are alternately repeated, and detecting an inter-electrode voltage of the discharge lamp, in which the first frequency includes a plurality of different frequencies, and in which the first frequency is changed on the basis of at least one of the detected inter-electrode voltage and driving power supplied to the discharge lamp.

According to the discharge lamp driving method of the aspect of the invention, as described above, it is possible to improve a service life of the discharge lamp.

Further another aspect of the invention is directed to a discharge lamp driving method for supplying a driving current to a discharge lamp including electrodes and driving the discharge lamp, the method including supplying the driving current including a hybrid period in which a first period for supplying an AC current with a first frequency to the discharge lamp and a second period for supplying a DC current to the discharge lamp are alternately repeated, a fourth period in which an AC current with a second frequency lower than the first frequency is supplied to the discharge lamp, and a fifth period in which a third DC period in which a DC current is supplied to the discharge lamp, and a fourth DC period in which a DC current with a polarity opposite to a polarity of the DC current supplied to the discharge lamp in the third DC period is supplied to the discharge lamp, are alternately included, in which a length of the third DC period is longer than a length of the fourth DC period, in which the length of the fourth DC period is less than 0.5 ms, and in which a total of the lengths of the third DC periods in the fifth period is longer than a length of the second period, and is longer than a length of half a cycle of the AC current with the second frequency in the fourth period.

According to the discharge lamp driving method of the aspect of the invention, as described above, it is possible to improve a service life of the discharge lamp.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to the drawings, a projector according to embodiments of the invention will be described.

The scope of the invention is not limited to the following embodiments, and can be arbitrarily changed within the scope of the technical spirit of the invention. In the following drawings, for better understanding of each constituent element, a scale, the number, and the like thereof in each structure may be different from a scale, the number, and the like thereof in an actual structure.

First Embodiment

Figure 1:
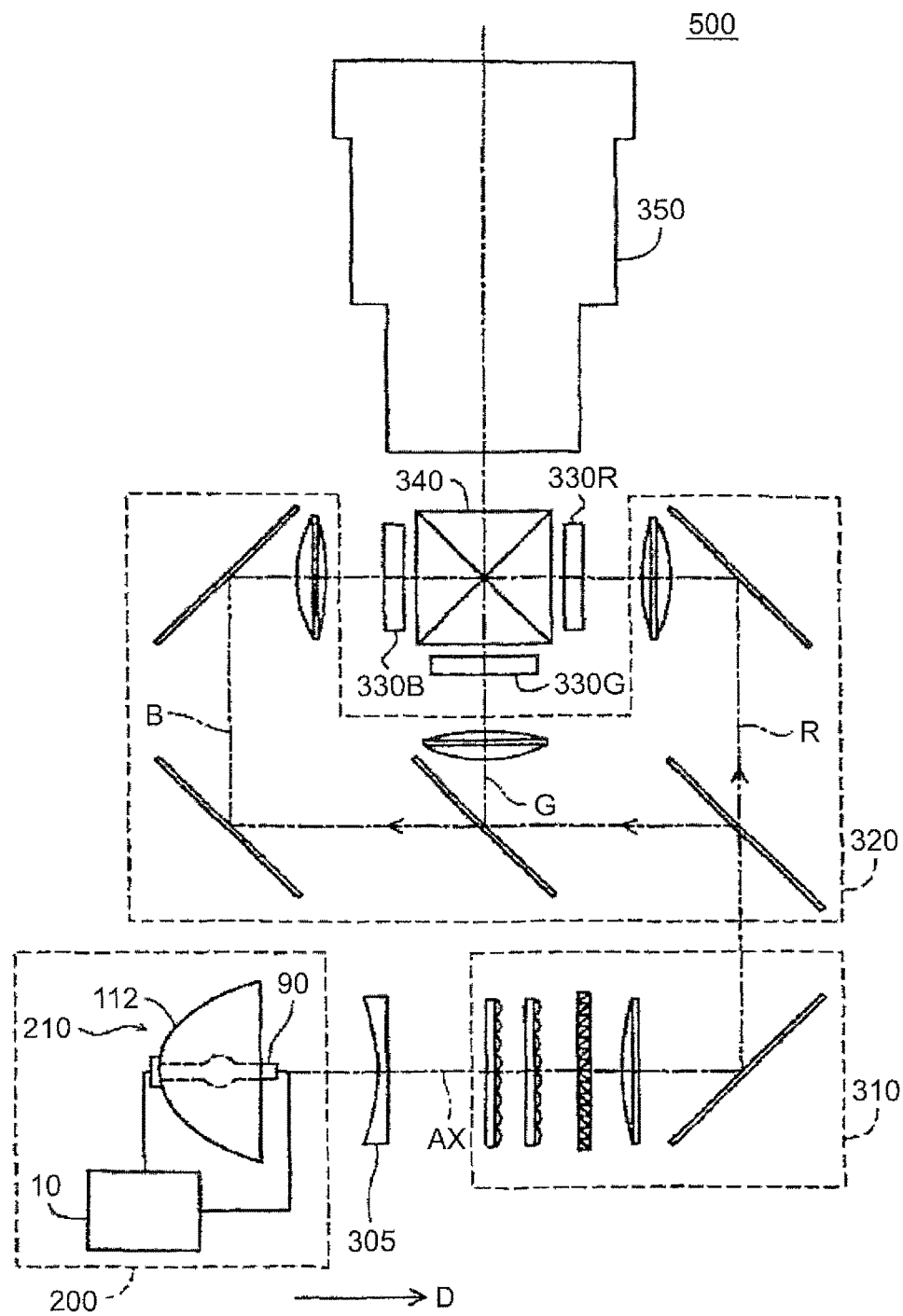
FIG. 1 is a schematic configuration diagram illustrating a projector according to a first embodiment.

As illustrated in FIG. 1, a projector 500 of the present embodiment includes a light source apparatus 200, a collimating lens 305, an illumination optical system 310, a color separation optical system 320, three liquid crystal light valves (light modulation devices) 330R, 330G and 330B, a cross dichroic prism 340, and a projection optical system 350.

Light emitted from the light source apparatus 200 passes through the collimating lens 305 and is incident to the illumination optical system 310. The collimating lens 305 collimates the light from the light source apparatus 200.

The illumination optical system 310 adjusts the illuminance of the light emitted from the light source apparatus 200 so that the illuminance is uniformized on the liquid crystal light valves 330R, 330G and 330B. The illumination optical system 310 aligns polarization directions of the light emitted from the light source apparatus 200 in one direction. This is aimed at effectively using the light emitted from the light source apparatus 200 in the liquid crystal light valves 330R, 330G and 330B.

The light having undergone the adjustment of the illuminance distribution and the polarization directions is incident to the color separation optical system 320. The color separation optical system 320 separates the incident light into three color light beams including red light (R), green light (G), and blue light (B). The three color light beams are respectively modulated according to video signals by the liquid crystal light valves 330R, 330G and 330B which correspond to the respective color light beams. The liquid crystal light valves 330R, 330G and 330B respectively include liquid crystal panels 560R, 560G and 560B which will be described later, and polarization plates (not illustrated). The polarization plates are disposed on a light incidence side and a light emission side of each of the liquid crystal panels 560R, 560G and 560B.

The three modulated color light beams are combined with each other by the cross dichroic prism 340. The combined light is incident to the projection optical system 350. The projection optical system 350 projects the incident light onto a screen 700 (refer to FIG. 3). Thus, a video is displayed on the screen 700. In addition, well-known configurations may be employed as configurations of the collimating lens 305, the illumination optical system 310, the color separation optical system 320, the cross dichroic prism 340, and the projection optical system 350.

Figure 2:
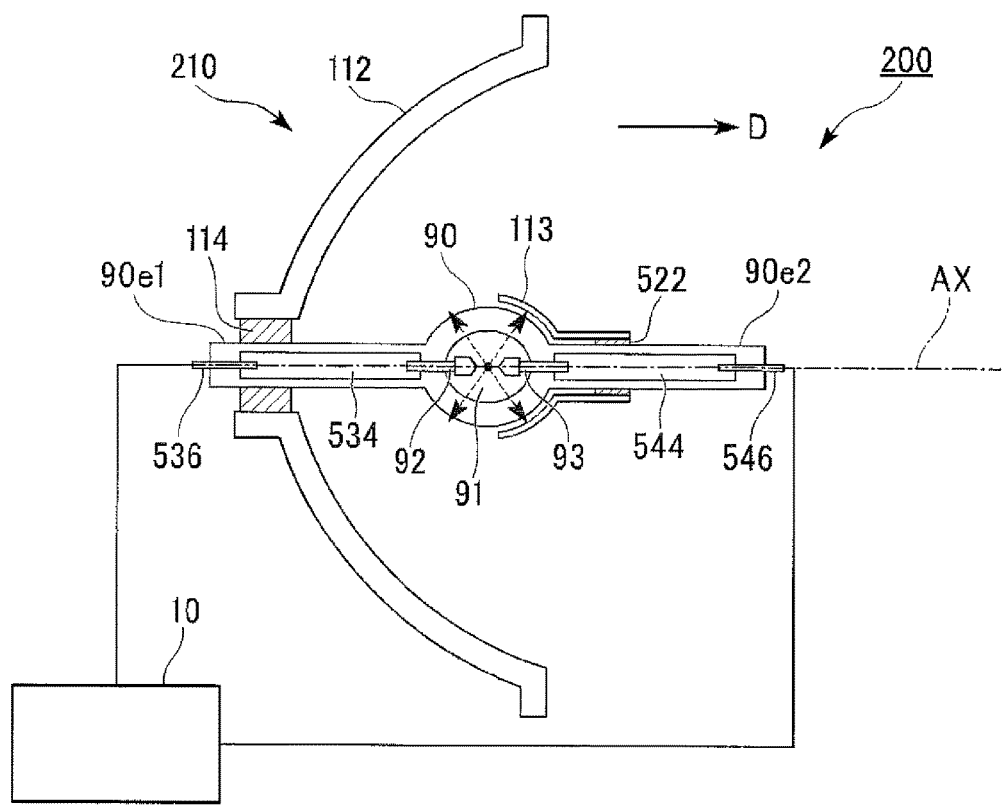
FIG. 2 is a diagram illustrating a discharge lamp in the first embodiment.

FIG. 2 is a sectional view illustrating a configuration of the light source apparatus 200. The light source apparatus 200 includes a light source unit 210 and a discharge lamp lighting device (discharge lamp driving device) 10. FIG. 2 shows a sectional view of the light source unit 210. The light source unit 210 includes a main reflection mirror 112, a discharge lamp 90, and a subsidiary reflection mirror 113.

The discharge lamp lighting device 10 supplies a driving current I to the discharge lamp 90 so as to light the discharge lamp 90. The main reflection mirror 112 reflects light emitted from the discharge lamp 90 in an irradiation direction D. The irradiation direction D is parallel to an optical axis AX of the discharge lamp 90.

The discharge lamp 90 has a rod shape extending in the irradiation direction D. One end of the discharge lamp 90 is referred to as a first end 90e1, and the other end of the discharge lamp 90 is referred to as a second end 90e2. A material of the discharge lamp 90 is, for example, a light transmissive material such as quartz glass. A central portion of the discharge lamp 90 is swollen in a spherical shape, and the inside thereof is a discharge space 91. A gas which is a discharge medium containing rare gases, metal halogen compounds, and the like is enclosed in the discharge space 91.

Tips of a first electrode 92 and a second electrode 93 protrude in the discharge space 91. The first electrode 92 is disposed on the first end 90e1 side of the discharge space 91. The second electrode 93 is disposed on the second end 90e2 side of the discharge space 91. Each of the first electrode 92 and the second electrode 93 has a rod shape extending in the optical axis AX. The tips of the first electrode 92 and the second electrode 93 are disposed to face each other with a predetermined distance in the discharge space 91. A material of each of the first electrode 92 and the second electrode 93 is, for example, a metal such as tungsten.

A first terminal 536 is provided at the first end 90e1 of the discharge lamp 90. The first terminal 536 and the first electrode 92 are electrically connected to each other via a conductive member 534 which penetrates through the discharge lamp 90. Similarly, a second terminal 546 is provided at the second end 90e2 of the discharge lamp 90. The second terminal 546 and the second electrode 93 are electrically connected to each other via a conductive member 544 which penetrates through the discharge lamp 90. A material of each of the first terminal 536 and the second terminal 546 is, for example, a metal such as tungsten. As a material of each of the conductive members 534 and 544, for example, a molybdenum foil is used.

The first terminal 536 and the second terminal 546 are connected to the discharge lamp lighting device 10. The discharge lamp lighting device 10 supplies the driving current I for driving the discharge lamp 90 to the first terminal 536 and the second terminal 546. As a result, arc discharge occurs between the first electrode 92 and the second electrode 93. Light (discharge light) generated due to the arc discharge is radiated in all directions from the discharge position as indicated by dashed arrows.

The main reflection mirror 112 is fixed to the first end 90e1 of the discharge lamp 90 via a fixation member 114. The main reflection mirror 112 reflects light which travels toward an opposite side to the irradiation direction D among discharge light beams, in the irradiation direction D. A shape of a reflection surface (a surface on the discharge lamp 90 side) of the main reflection mirror 112 is not particularly limited within a range in which discharge light can be reflected in the irradiation direction D, and may be, for example, a spheroidal shape or a rotating parabolic shape. For example, in a case where a shape of the reflection surface of the main reflection mirror 112 is a rotating parabolic shape, the main reflection mirror 112 can convert discharge light into light which is substantially parallel to the optical axis AX. Consequently, the collimating lens 305 can be omitted.

The subsidiary reflection mirror 113 is fixed to the second end 90e2 side of the discharge lamp 90 via a fixation member 522. A shape of a reflection surface (a surface on the discharge lamp 90 side) of the subsidiary reflection mirror 113 is a spherical shape which surrounds a portion of the discharge space 91 on the second end 90e2 side. The subsidiary reflection mirror 113 reflects light which travels toward an opposite side to the side on which the main reflection mirror 112 is disposed among the discharge light beams, toward the main reflection mirror 112. Consequently, it is possible to increase usage efficiency of the light radiated from the discharge space 91.

A material of each of the fixation members 114 and 522 is not particularly limited as long as the material is a heat resistant material which can resist heat generated from the discharge lamp 90, and is, for example, an inorganic adhesive. A method of fixing the main reflection mirror 112, the subsidiary reflection mirror 113, and the discharge lamp 90 to each other is not limited to a method in which the main reflection mirror 112 and the subsidiary reflection mirror 113 are fixed to the discharge lamp 90, and may employ any method. For example, the discharge lamp 90 and the main reflection mirror 112 may be separately fixed to a casing (not illustrated) of the projector 500. This is also the same for the subsidiary reflection mirror 113.

Hereinafter, a circuit configuration of the projector 500 will be described.

Figure 3:
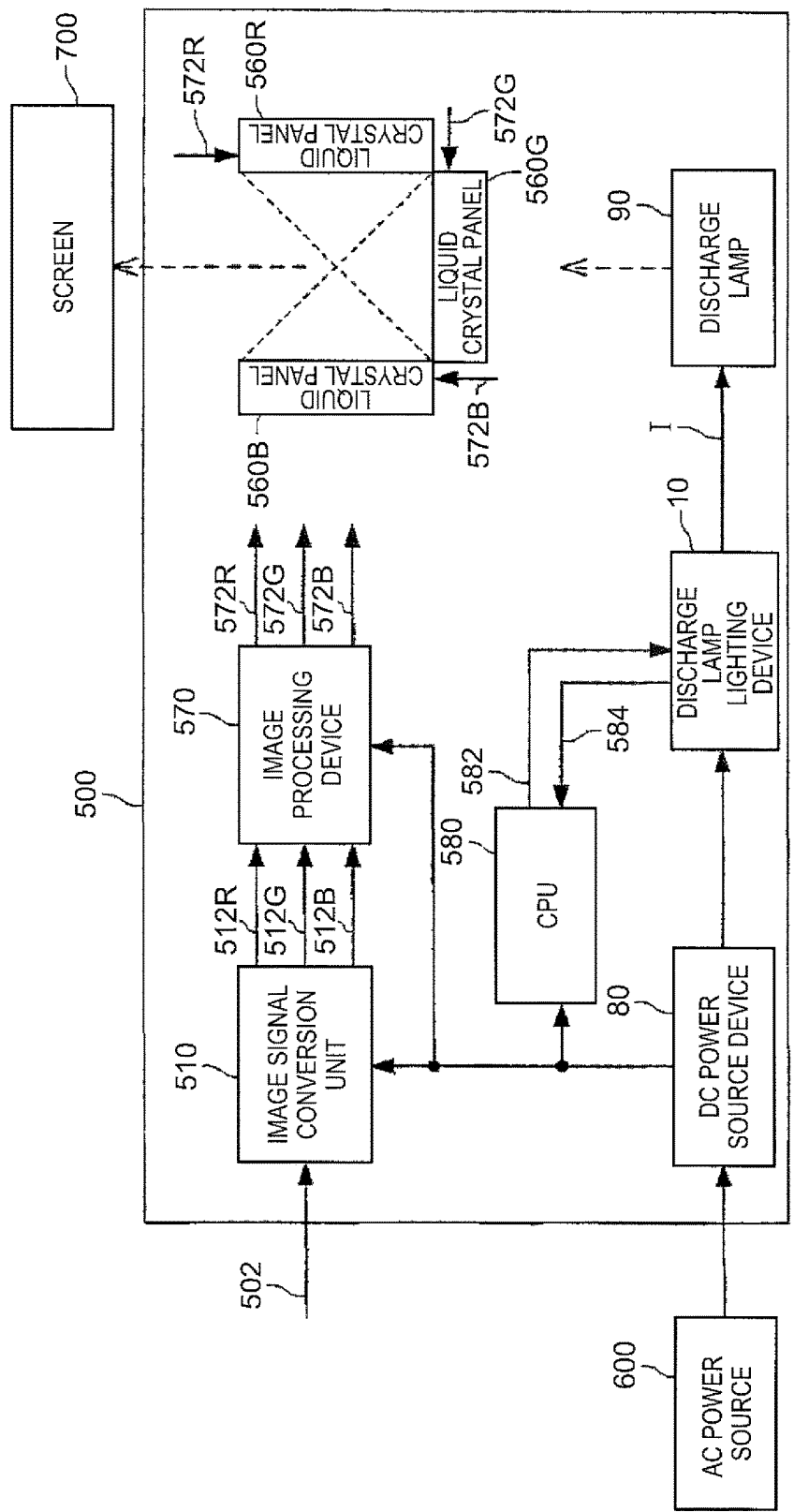
FIG. 3 is a block diagram illustrating various constituent elements of the projector according to the first embodiment.

FIG. 3 is a diagram illustrating an example of a circuit configuration of the projector 500 according to the present embodiment. The projector 500 includes an image signal conversion unit 510, a DC power source device 80, the liquid crystal panels 560R, 560G and 560B, an image processing device 570, and a central processing unit (CPU) 580, in addition to the optical systems illustrated in FIG. 1.

The image signal conversion unit 510 converts image signals 502 (luminance-color difference signals, analog RGB signals, or the like) which are input from an external device into digital RGB signals with a predetermined word length so as to generate image signals 512R, 512G and 512B which are then supplied to the image processing device 570.

The image processing device 570 performs an image process on each of the three image signals 512R, 512G and 512B. The image processing device 570 supplies driving signals 572R, 572G and 572B for respectively driving the liquid crystal panels 560R, 560G and 560B, to the liquid crystal panels 560R, 560G and 560B.

The DC power source device 80 converts an AC voltage supplied from an external AC power source 600 into a constant DC voltage. The DC power source device 80 supplies DC voltages to the image signal conversion unit 510 and the image processing device 570 located on a secondary side of a transformer (not illustrated but included in the DC power source device 80) and the discharge lamp lighting device 10 located on a primary side of the transformer.

The discharge lamp lighting device 10 generates a high voltage between the electrodes of the discharge lamp 90 so as to cause dielectric breakdown and thus form a discharge path during activation. Thereafter, the discharge lamp lighting device 10 supplies the driving current I for the discharge lamp 90 maintaining discharge.

The liquid crystal panels 560R, 560G and 560B are respectively provided in the above-described liquid crystal light valves 330R, 330G and 330B. The liquid crystal panels 560R, 560G and 560B modulate transmittance (luminance) of the color light beams which are respectively incident to the liquid crystal panels 560R, 560G and 560B via the above-described optical systems on the basis of the respective driving signals 572R, 572G and 572B.

The CPU 580 controls various operations from starting of lighting of the projector 500 to putting-out thereof. For example, in the example illustrated in FIG. 3, a lighting command or a putting-out command is output to the discharge lamp lighting device 10 via a communication signal 582. The CPU 580 receives lighting information of the discharge lamp 90 from the discharge lamp lighting device 10 via a communication signal 584.

Hereinafter, a description will be made of a configuration of the discharge lamp lighting device 10.

Figure 4:
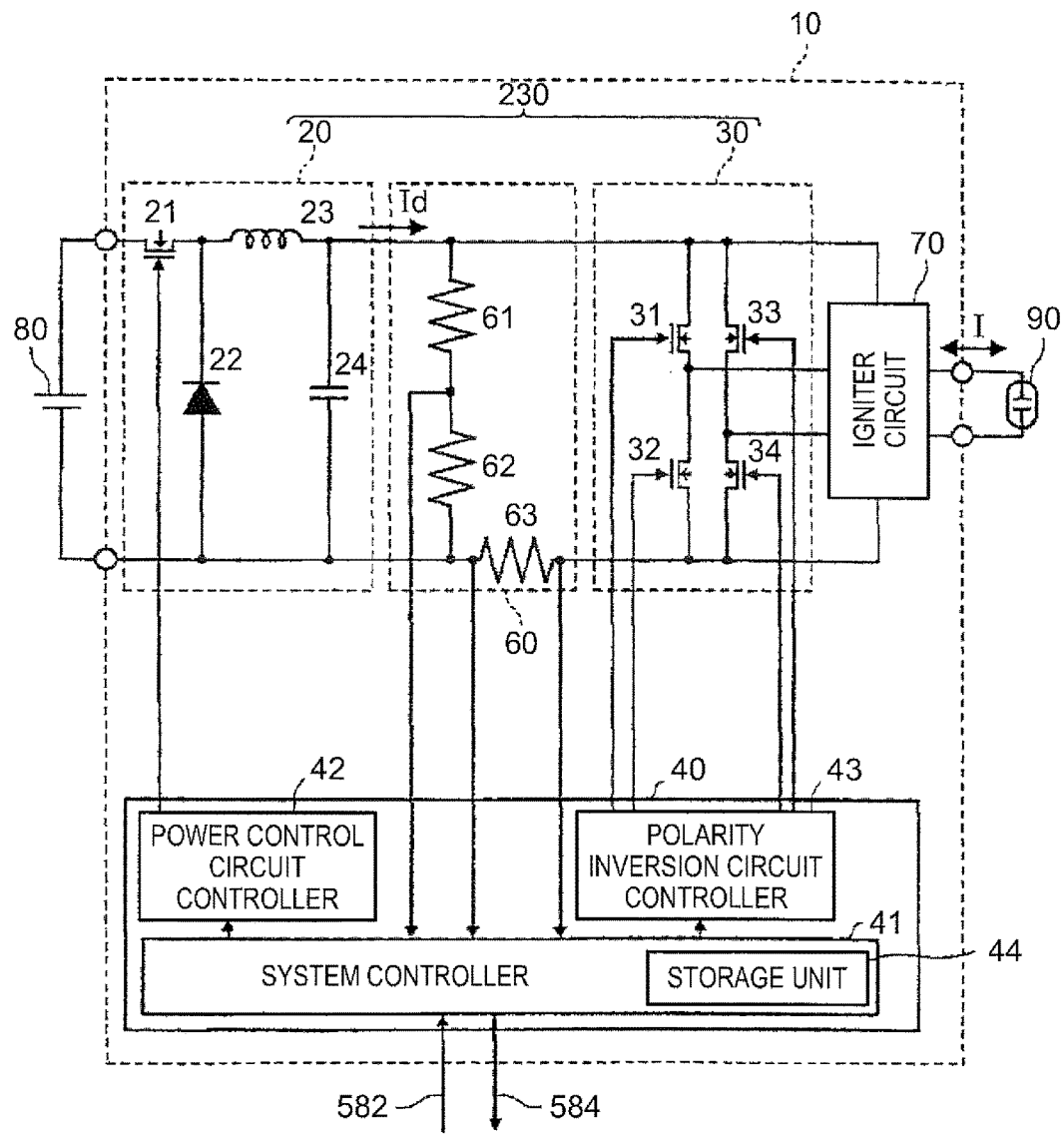
FIG. 4 is a circuit diagram illustrating a discharge lamp lighting device according to the first embodiment.

FIG. 4 is a diagram illustrating an example of a circuit configuration of the discharge lamp lighting device 10.

The discharge lamp lighting device 10 includes, as illustrated in FIG. 4, a power control circuit 20, a polarity inversion circuit 30, a controller 40, an operation detection unit 60, and an igniter circuit 70.

The power control circuit 20 generates driving power which is supplied to the discharge lamp 90. In the present embodiment, the power control circuit 20 is constituted of a down chopper circuit which receives a voltage from the DC power source device 80 and outputs a DC current Id by stepping down the input voltage.

The power control circuit 20 is configured to include a switch element 21, a diode 22, a coil 23, and a capacitor 24. The switch element 21 is constituted of, for example, a transistor. In the present embodiment, one end of the switch element 21 is connected to a positive voltage side of the DC power source device 80, and the other end thereof is connected to a cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power source device 80. A current control signal is input to a control terminal of the switch element 21 from the controller 40 which will be described later, and thus turning-on and turning-off of the switch element 21 are controlled. As the current control signal, for example, a pulse width modulation (PWM) control signal may be used.

If the switch element 21 is turned on, a current flows through the coil 23, and thus energy is accumulated in the coil 23. Thereafter, if the switch element 21 is turned off, the energy accumulated in the coil 23 is released along a path passing through the capacitor 24 and the diode 22. As a result, the DC current Id is generated which is proportional to a time period in which the switch element 21 is turned on.

The polarity inversion circuit 30 inverts a polarity of the DC current Id which is input from the power control circuit 20, at a predetermined timing. Consequently, the polarity inversion circuit 30 generates and outputs a driving current I as a DC which is continuously maintained only for a controlled time period, or a driving current I as an AC which has any frequency. In the present embodiment, the polarity inversion circuit 30 is constituted of an inverter bridge circuit (full bridge circuit).

The polarity inversion circuit 30 includes, for example, a first switch element 31, a second switch element 32, a third switch element 33, and a fourth switch element 34, constituted of transistors. The polarity inversion circuit 30 has a configuration in which the first switch element 31 and the second switch element 32 which are connected in series to each other are connected in parallel to the third switch element 33 and the fourth switch element 34 which are connected in series to each other. A polarity inversion control signal is input from the controller 40 to each of control terminals of the first switch element 31, the second switch element 32, the third switch element 33, and the fourth switch element 34. Turning-on and turning-off operations of each of the first switch element 31, the second switch element 32, the third switch element 33, and the fourth switch element 34 are controlled on the basis of the polarity inversion control signal.

In the polarity inversion circuit 30, an operation is repeatedly performed in which the first switch element 31 and the fourth switch element 34, and the second switch element 32 and the third switch element 33 are alternately turned on or off. Therefore, the polarities of the DC current Id output from the power control circuit 20 are alternately inverted. The polarity inversion circuit 30 generates and outputs a driving current I as a DC which is continuously maintained in the same polarity state only for a controlled time period or a driving current I as an AC having a controlled frequency, from a common connection point between the first switch element 31 and the second switch element 32, and a common connection point between the third switch element 33 and the fourth switch element 34.

In other words, in the polarity inversion circuit 30, the second switch element 32 and the third switch element 33 are controlled to be turned off when the first switch element 31 and the fourth switch element 34 are turned on, and the second switch element 32 and the third switch element 33 are controlled to be turned on when the first switch element 31 and the fourth switch element 34 are turned off. Thus, the driving current I is generated which flows in order of the first switch element 31, the discharge lamp 90, and the fourth switch element 34 from one end of the capacitor 24 when the first switch element 31 and the fourth switch element 34 are turned on. The driving current I is generated which flows in order of the third switch element 33, the discharge lamp 90, and the second switch element 32 from one end of the capacitor 24 when the second switch element 32 and the third switch element 33 are turned on.

In the present embodiment, the portion including the power control circuit 20 and the polarity inversion circuit 30 corresponds to a discharge lamp driving unit 230. In other words, the discharge lamp driving unit 230 supplies the driving current I for driving the discharge lamp 90 to the discharge lamp 90.

The controller 40 controls the discharge lamp driving unit 230. In the example illustrated in FIG. 4, the controller 40 controls the power control circuit 20 and the polarity inversion circuit 30 so as to control parameters such as a duration in which the driving current I is continuously maintained to have the same polarity, and a current value (a power value of the driving power) and a frequency of the driving current I. The controller 40 performs polarity inversion control for controlling the duration in which the driving current I is continuously maintained to have the same polarity, a frequency of the driving current I, and the like, on the polarity inversion circuit 30, on the basis of a polarity inversion timing of the driving current I. The controller 40 performs current control for controlling a current value of the output DC current Id on the power control circuit 20.

In the present embodiment, the controller 40 can perform hybrid driving including AC driving and DC driving. In the AC driving, an AC current is supplied to the discharge lamp 90. In the DC driving, a DC current is supplied to the discharge lamp 90. In the hybrid driving, the AC driving and the DC driving are alternately performed. A driving current waveform of the driving current I supplied to the discharge lamp 90 through each discharge lamp driving will be described later in detail.

A configuration of the controller 40 is not particularly limited. In the present embodiment, the controller 40 is configured to include a system controller 41, a power control circuit controller 42, and a polarity inversion circuit controller 43. Some or all of the controllers of the controller 40 may be configured by using semiconductor integrated circuits.

The system controller 41 controls the power control circuit controller 42 and the polarity inversion circuit controller 43 so as to control the power control circuit 20 and the polarity inversion circuit 30. The system controller 41 may control the power control circuit controller 42 and the polarity inversion circuit controller 43 on the basis of a lamp voltage (a voltage between the electrodes) Vla and a driving current I detected by the operation detection unit 60.

In the present embodiment, the system controller 41 is connected to a storage unit 44.

The system controller 41 may control the power control circuit 20 and the polarity inversion circuit 30 on the basis of information stored in the storage unit 44. The storage unit 44 may store, for example, information regarding driving parameters such as the duration in which the driving current I is continuously maintained to have the same polarity, a current value, a frequency, a waveform, and a modulation pattern of the driving current I.

The power control circuit controller 42 outputs a current control signal to the power control circuit 20 on the basis of a control signal from the system controller 41, so as to control the power control circuit 20.

The polarity inversion circuit controller 43 outputs a polarity inversion control signal to the polarity inversion circuit 30 on the basis of a control signal from the system controller 41, so as to control the polarity inversion circuit 30.

The controller 40 may be implemented by using a dedicated circuit so as to perform the above-described control or various control operations related to processes to be described later. In contrast, the controller 40 may function as a computer, for example, by the CPU executing a control program stored in the storage unit 44, so as to perform various control operations related to such processes.

Figure 5:
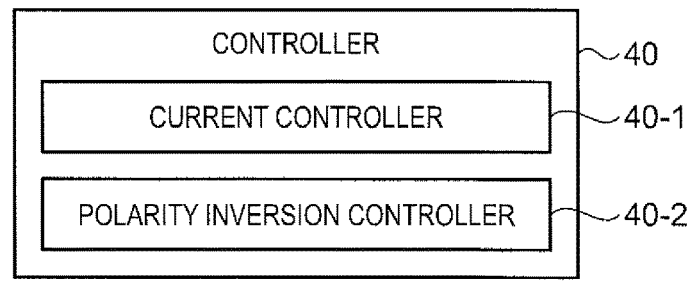
FIG. 5 is a block diagram illustrating a configuration example of a controller according to the first embodiment.

FIG. 5 is a diagram illustrating another configuration example of the controller 40. As illustrated in FIG. 5, the controller 40 may be configured to function as a current controller 40-1 which controls the power control circuit 20 and a polarity inversion controller 40-2 which controls the polarity inversion circuit 30 according to the control program.

In the example illustrated in FIG. 4, the controller 40 is configured as a part of the discharge lamp lighting device 10. In contrast, the CPU 580 may be configured to realize some or all of the functions of the controller 40.

In the present embodiment, the operation detection unit 60 includes a voltage detection portion which detects a lamp voltage Vla of the discharge lamp 90 and outputs lamp voltage information to the controller 40. The operation detection unit 60 may include a current detection portion or the like which detects the driving current I and outputs driving current information to the controller 40. In the present embodiment, the operation detection unit 60 is configured to include a first resistor 61, a second resistor 62, and a third resistor 63.

In the present embodiment, the voltage detection portion of the operation detection unit 60 detects the lamp voltage Vla on the basis of a voltage divided by the first resistor 61 and the second resistor 62 which are connected in parallel to the discharge lamp 90 and are connected in series to each other. In addition, in the present embodiment, the current detection portion detects the driving current I on the basis of a voltage occurring at the third resistor 63 which is connected in series to the discharge lamp 90.

The igniter circuit 70 operates only at the time of starting of lighting of the discharge lamp 90. The igniter circuit 70 supplies a high voltage (a voltage higher than at normal lighting of the discharge lamp 90) which is necessary to cause dielectric breakdown between the electrodes (between the first electrode 92 and the second electrode 93) of the discharge lamp 90 and thus form a discharge path, between the electrodes of the discharge lamp 90 (between the first electrode 92 and the second electrode 93) at the time of starting of lighting of the discharge lamp 90. In the present embodiment, the igniter circuit 70 is connected in parallel to the discharge lamp 90.

Figure 6A:
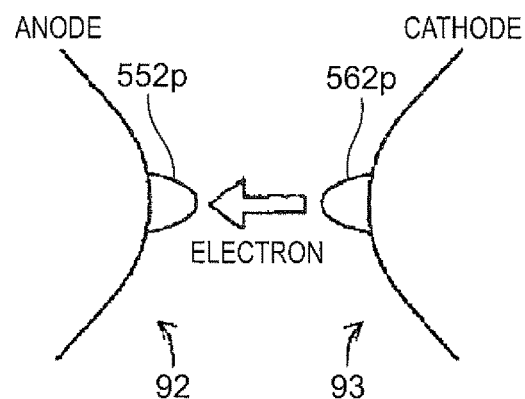
FIG. 6A is a diagram illustrating states of protrusions of electrode tips of the discharge lamp.
Figure 6B:
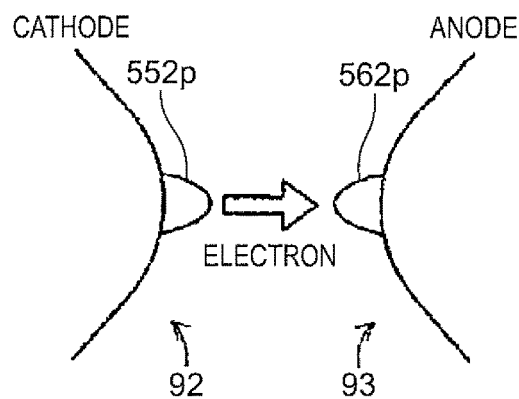
FIG. 6B is a diagram illustrating states of protrusions of electrode tips of the discharge lamp.

FIGS. 6A and 6B illustrate the tips of the first electrode 92 and the second electrode 93. Protrusions 552p and 562p are respectively formed at the tips of the first electrode 92 and the second electrode 93.

Discharge occurring between the first electrode 92 and the second electrode 93 mainly occurs between the protrusion 552p and the protrusion 562p. In a case where the protrusions 552p and 562p are provided as in the present embodiment, movements of discharge positions (arc positions) at the first electrode 92 and the second electrode 93 can be minimized compared with a case where no protrusions are provided.

FIG. 6A illustrates a first polarity state in which the first electrode 92 operates as an anode, and the second electrode 93 operates as a cathode. In the first polarity state, electrons move from the second electrode 93 (cathode) to the first electrode 92 (anode) due to discharge. The electrons are emitted from the cathode (second electrode 93). The electrons emitted from the cathode (second electrode 93) collide with the tip of the anode (first electrode 92). Heat is generated due to the collision, and thus the temperature of the tip (protrusion 552p) of the anode (first electrode 92) increases.

FIG. 6B illustrates a second polarity state in which the first electrode 92 operates as a cathode, and the second electrode 93 operates as an anode. Contrary to the first polarity state, in the second polarity state, electrons move from the first electrode 92 to the second electrode 93. As a result, the temperature of the tip (protrusion 562p) of the second electrode 93 increases.

As mentioned above, when the driving current I is supplied to the discharge lamp 90, the temperature of the anode with which the electrons collide increases. On the other hand, the temperature of the cathode which emits the electrons decreases during emission of the electrons toward the anode.

An inter-electrode distance between the first electrode 92 and the second electrode 93 increases due to deterioration in the protrusions 552p and 562p. This is because the protrusions 552p and 562p wear. If the inter-electrode distance increases, resistance between the first electrode 92 and the second electrode 93 increases, and thus the lamp voltage Vla also increases. Therefore, by referring to the lamp voltage Vla, it is possible to detect a change in the inter-electrode distance, that is, the extent of deterioration in the discharge lamp 90.

Since the first electrode 92 and the second electrode 93 have the same configuration, in the following description, only the first electrode 92 will be described as a representative thereof in some cases. Since the protrusion 552p at the tip of the first electrode 92 and the protrusion 562p at the tip of the second electrode 93 have the same configuration, in the following description, only the protrusion 552p will be described in some cases.

Hereinafter, a description will be made of control of the discharge lamp driving unit 230 performed by the controller 40 of the present embodiment. In the present embodiment, the controller 40 controls the discharge lamp driving unit 230 through hybrid driving in which AC driving and the DC driving are alternately repeatedly performed.

Figure 7:
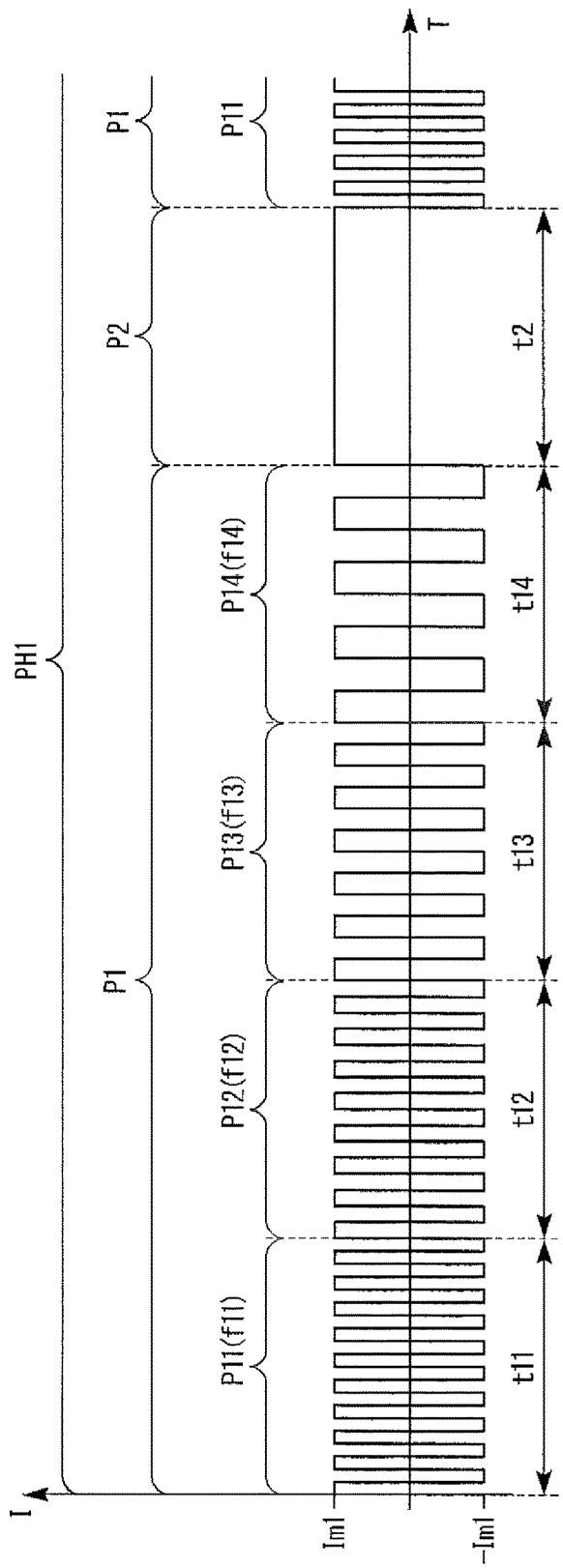
FIG. 7 is a diagram illustrating a driving current waveform in a hybrid period according to the first embodiment.

FIG. 7 is a diagram illustrating an example of a driving current waveform of the present embodiment. In FIG. 7, a longitudinal axis expresses the driving current I, and a transverse axis expresses time T. The driving current I is illustrated to be positive in a case of the first polarity state, and is illustrated to be negative in a case of the second polarity state.

As illustrated in FIG. 7, in the present embodiment, a hybrid period PH1 is provided in which a first period (AC driving period) P1 and a second period (DC driving period) P2 are alternatively repeated. The hybrid period PH1 is a period in which the hybrid driving is performed. The first period P1 is a period in which the AC driving is performed. The second period P2 is a period in which the DC driving is performed. The number of first periods P1 and the number of second periods P2 in the hybrid period PH1 are not particularly limited.

The first period P1 is a period in which an AC current with a first frequency f1 is supplied to the discharge lamp 90. In the present embodiment, the first period P1 includes a first AC period (AC period) P11, a second AC period (AC period) P12, a third AC period (AC period) P13, and a fourth AC period (AC period) P14. The first AC period P11, the second AC period P12, the third AC period P13, and the fourth AC period P14 are continuously provided in this order.

In the present embodiment, an AC current in the first AC period P11, the second AC period P12, the third AC period P13, and the fourth AC period P14 is, for example, a square wave AC current whose polarity is inverted between a current value Im1 and a current value −Im1 multiple times.

A first frequency f11 in the first AC period P11, a first frequency f12 in the second AC period P12, a first frequency f13 in the third AC period P13, and a first frequency f14 in the fourth AC period P14 are different from each other. In other words, the first frequency f1 includes a plurality of different frequencies, and the first period P1 includes a plurality of AC periods in which frequencies of AC current supplied to the discharge lamp 90 are different from each other.

The first frequency f11, the first frequency f12, the first frequency f13, and the first frequency f14 are lowered in this order. In other words, as an AC period is provided temporally later in the first period P1, a frequency of an AC current is lowered.

In the present embodiment, the controller 40 sets the first frequencies f11 to f14 on the basis of both of the lamp voltage Vla detected by the voltage detection portion of the operation detection unit 60 and driving power Wd supplied to the discharge lamp 90. In other words, the controller 40 sets the first frequencies f11 to f14 on the basis of at least one of the lamp voltage Vla and the driving power Wd. In other words, in the present embodiment, the controller 40 changes the first frequencies f11 to f14 on the basis of at least one of the lamp voltage Vla and the driving power Wd.

Figure 8:
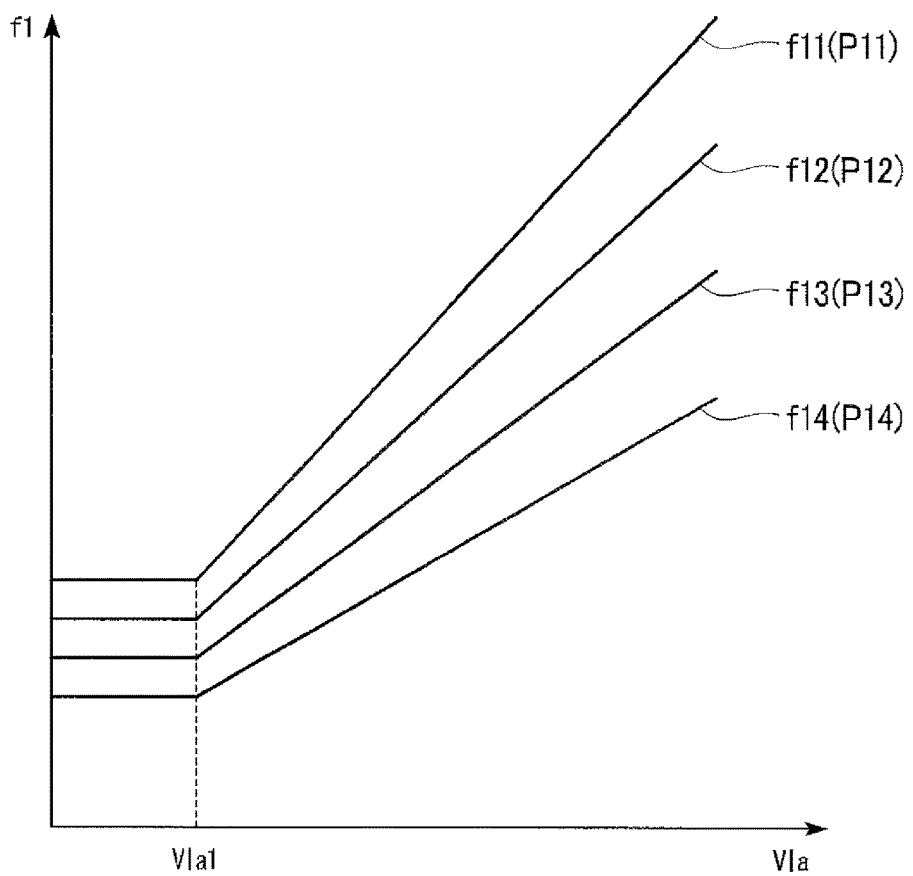
FIG. 8 is a graph illustrating an example of a relationship between a lamp voltage and a first frequency according to the first embodiment.

FIG. 8 is a graph illustrating an example of a relationship between the lamp voltage Vla and the first frequencies f11 to f14. In FIG. 8, a longitudinal axis expresses the first frequency f1, and a transverse axis expresses the lamp voltage Vla. FIG. 8 illustrates relationships between the lamp voltage Vla and the first frequencies f11 to f14 in a case where the driving power Wd has a constant value.

In the example illustrated in FIG. 8, the first frequencies f11 to f14 are constant in a range in which a value of the lamp voltage Vla is smaller than a predetermined value Vla1. In the example illustrated in FIG. 8, the first frequencies f11 to f14 are set to be higher as the lamp voltage Vla increases in a range in which a value of the lamp voltage Vla is equal to or greater than the predetermined value Vla1. In the range in which a value of the lamp voltage Vla is equal to or greater than the predetermined value Vla1, the relationships between the first frequencies f11 to f14 and the lamp voltage Vla are expressed by, for example, a linear function.

In the example illustrated in FIG. 8, a slope of a change in the first frequency f1 relative to the lamp voltage Vla in the range in which a value of the lamp voltage Vla is equal to or greater than the predetermined value Vla1 increases in order of the first frequency f14, the first frequency f13, the first frequency f12, and the first frequency f11. In other words, as the lamp voltage Vla increases, a value difference between the first frequencies f11 to f14 increases.

Figure 9:
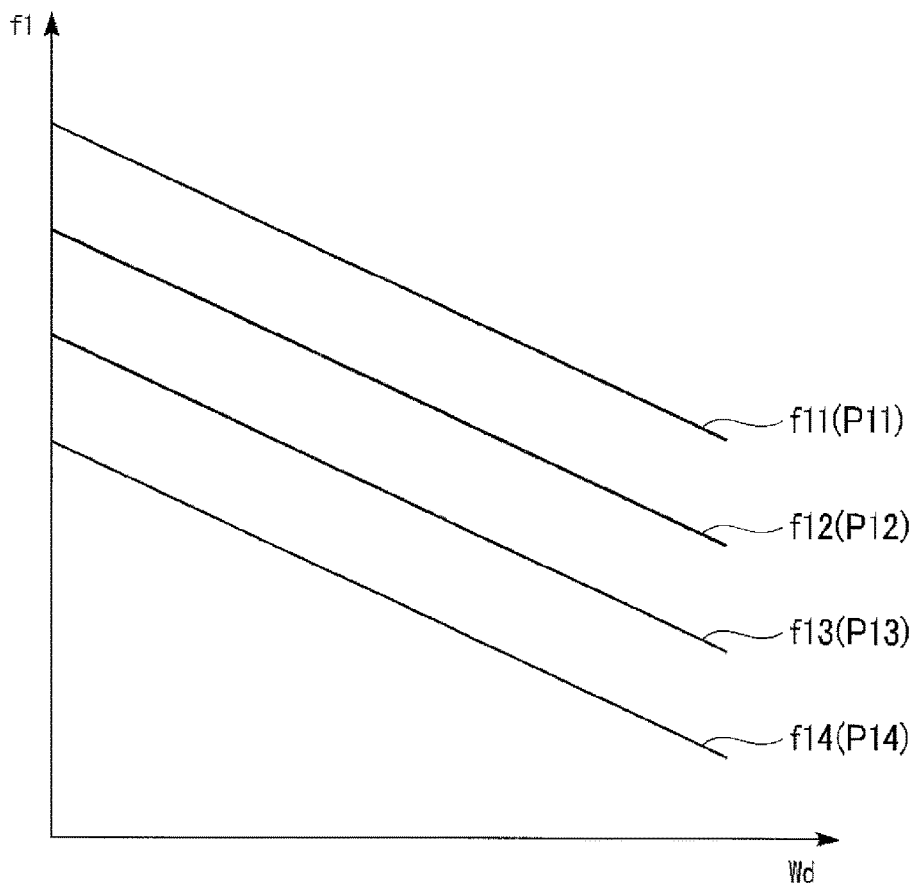
FIG. 9 is a graph illustrating an example of a relationship between driving power and the first frequency according to the first embodiment.

FIG. 9 is a graph illustrating an example of relationships between the driving power Wd and the first frequencies f11 to f14. In FIG. 9, a longitudinal axis expresses the first frequency f1, and a transverse axis expresses the driving power Wd. FIG. 9 illustrates relationships between the driving power Wd and the first frequencies f11 to f14 in a case where the lamp voltage Vla has a constant value.

In the example illustrated in FIG. 9, the first frequencies f11 to f14 are set to be higher as the driving power Wd is reduced. The relationships between the first frequencies f11 to f14 and the driving power Wd are expressed by, for example, a linear function. In the example illustrated in FIG. 9, a slope of a change in the first frequency f1 relative to the driving power Wd is the same as, for example, in the first frequencies f11 to f14.

In the present embodiment, the first frequency f1 is set on the basis of both of the change in the first frequency f1 relative to the lamp voltage Vla illustrated in FIG. 8 and the change in the first frequency f1 relative to the driving power Wd illustrated in FIG. 9. Specifically, a value of the first frequency f1 is set, for example, by adding or subtracting an amount of change of the first frequency f1 due to a change in the driving power Wd to or from a value of the first frequency f1 set for the lamp voltage Vla. A value of the first frequency f1 is, for example, between 50 Hz and 50 kHz.

In the present specification, as the lamp voltage Vla increases, the first frequency f1 may be set to become higher only in a predetermined range of values of the lamp voltage Vla as in the example illustrated in FIG. 8, and may be set to become higher in a whole range of taken values of the lamp voltage Vla.

In the present specification, as the driving power Wd is reduced, the first frequency f1 may be set to become higher in a whole range of taken values of the driving power Wd as in the example illustrated in FIG. 9, and may be set to become higher only in a predetermined range of values of the driving power Wd.

In the present specification, the content that, as the lamp voltage Vla increases, the first frequency f1 is set to become higher, includes that such setting is performed in a case where the driving power Wd is constant. In the present specification, the content that, as the driving power Wd is reduced, the first frequency f1 is set to become higher, includes that such setting is performed in a case where the lamp voltage Vla is constant.

In other words, for example, in a case where the first frequency f1 is set on the basis of the lamp voltage Vla and the driving power Wd as in the present embodiment, an actual first frequency f1 may be low since the driving power Wd increases even if the lamp voltage Vla increases, and an actual first frequency f1 may be high since the lamp voltage Vla is reduced even if the driving power Wd increases.

In the present embodiment, a starting polarity of the first period P1 is, for example, a polarity opposite to an ending polarity of a previously provided period, that is, the second period P2. The starting polarity is a polarity of the driving current I at a time point at which a certain period starts. The ending polarity is a polarity of the driving current I at a time point at which a certain period ends.

Specifically, for example, in a case where a polarity of the DC current supplied to the discharge lamp 90 in the second period P2 provided immediately before the first period P1 is a second polarity, the ending polarity of the second period P2 is the second polarity, and thus the starting polarity of the first period P1 is a first polarity. In the present embodiment, the starting polarity of the first period P1 is a starting polarity of the first AC period P11.

As illustrated in FIG. 7, in the present embodiment, a length t11 of the first AC period P11, a length t12 of the second AC period P12, a length t13 of the third AC period P13, and a length t14 of the fourth AC period P14 are the same as each other, for example. The number T1 of cycles of the AC current included in each AC period is set, for example, on the basis of both of the lamp voltage Vla and the driving power Wd. In the present embodiment, the number T1 of cycles of the AC current included in each AC period is set, for example, on the basis of the first frequency f1 which is set on the basis of both of the lamp voltage Vla and the driving power Wd.

In other words, the number T11 of cycles in the first AC period P11 illustrated in FIG. 7 is set on the basis of the first frequency f11. The number T12 of cycles in the second AC period P12 is set on the basis of the first frequency f12. The number T13 of cycles in the third AC period P13 is set on the basis of the first frequency f13. The number T14 of cycles in the fourth AC period P14 is set on the basis of the first frequency f14. Specifically, the number of cycles is obtained, for example, by multiplying each first frequency f1 by the length of each period.

In the present embodiment, the length t1 of the first period P1, that is, a total length of the lengths t11 to t14 is, for example, 10 milliseconds (ms) to 10 seconds (s). The length t1 of the first period P1 is set in the above-described way, and thus thermal loads can be appropriately applied to the protrusion 552p of the first electrode 92 and the protrusion 562p of the second electrode 93.

The second period P2 is a period in which a DC current is supplied to the discharge lamp 90. In the example illustrated in FIG. 7, in the second period P2, the driving current I which has the constant current value Im1 and the first polarity is supplied to the discharge lamp 90. Polarities of the DC current supplied to the discharge lamp 90 in the second period P2 of the hybrid period PH1 are inverted whenever the second period P2 is provided.

In other words, in the hybrid period PH1, a polarity of the DC current supplied to the discharge lamp 90 in the second period P2 provided immediately before the first period P1 is different from a polarity of the DC current supplied to the discharge lamp 90 in the second period P2 provided immediately after the first period P1. For example, in a case where a polarity of the DC current supplied to the discharge lamp 90 in the second period P2 provided immediately before the first period P1 is the first polarity in the same manner as that of the DC current supplied to the discharge lamp 90 in the second period P2 illustrated in FIG. 7, a polarity of the DC current supplied to the discharge lamp 90 in the second period P2 provided immediately after the first period P1 is the second polarity opposite to the first polarity. In this case, in the second period P2 provided immediately after the first period P1, the driving current I which has the constant current value −Im1 and the second polarity is supplied to the discharge lamp 90.

A length t2 of the second period P2 illustrated in FIG. 7 is longer than a length of half a cycle of the AC current with the first frequency f11 in the first period P1. The length t2 of the second period P2 is, for example, equal to or more than 10 ms and is equal to or less than 20 ms. The length t2 of the second period P2 is set in the above-described way, and thus a thermal load can be appropriately applied to the protrusion 552p of the first electrode 92.

In the present embodiment, the controller 40 sets the length t2 of the second period P2 on the basis of both of the lamp voltage Vla and the driving power Wd. In other words, in the present embodiment, the controller 40 sets the length t2 of the second period P2 on the basis of at least one of the lamp voltage Vla and the driving power Wd. In other words, in the present embodiment, the controller 40 changes the length t2 of the second period P2 on the basis of at least one of the lamp voltage Vla and the driving power Wd. For example, the length t2 of the second period P2 is set to become longer as the lamp voltage Vla increases. For example, the length t2 of the second period P2 is set to become shorter as the driving power Wd increases.

A relationship between the length t2 of the second period P2 and the lamp voltage Vla is expressed by, for example a linear function in a case where the driving power Wd is made constant. A relationship between the length t2 of the second period P2 and the driving power Wd is expressed by, for example, a linear function in a case where the lamp voltage Vla is made constant.

In the present specification, as the lamp voltage Vla increases, the length t2 of the second period P2 may be set to become longer only in a predetermined range of values of the lamp voltage Vla, and may be set to become longer in a whole range of taken values of the lamp voltage Vla.

In the present specification, as the driving power Wd increases, the length t2 of the second period P2 may be set to become shorter only in a predetermined range of values of the driving power Wd, and may be set to become shorter in a whole range of taken values of the driving power Wd.

In other words, in a case where the lamp voltage Vla is equal to or less than a predetermined value, for example, the length t2 of the second period P2 may be constant. In a case where the driving power Wd is equal to or less than a predetermined value, for example, the length t2 of the second period P2 may be constant.

In the present specification, the content that, as the lamp voltage Vla increases, the length t2 of the second period P2 is set to become longer, includes that such setting is performed in a case where the driving power Wd is constant. In the present specification, the content that, as the driving power Wd increases, the length t2 of the second period P2 is set to become shorter, includes that such setting is performed in a case where the lamp voltage Vla is constant.

In other words, for example, in a case where the length t2 of the second period P2 is set on the basis of the lamp voltage Vla and the driving power Wd as in the present embodiment, a provided length t2 of the second period P2 may be short since the driving power Wd increases even if the lamp voltage Vla increases, and a provided length t2 of the second period P2 may be long since the lamp voltage Vla is reduced even if the driving power Wd increases.

The above-described control performed by the controller 40 may be expressed as a discharge lamp driving method. In other words, according to an aspect of the present embodiment, there is provided a discharge lamp driving method including supplying the driving current I to the discharge lamp 90 including the first electrode 92 and the second electrode 93 so as to drive the discharge lamp 90, in which the hybrid period PH1 is provided in which the first period P1 for supplying an AC current with the first frequency f1 to the discharge lamp 90 and the second period P2 for supplying a DC current to the discharge lamp 90 are alternately repeated, the first frequency f1 including a plurality of different frequencies, and the first frequency f1 being changed on the basis of at least one of the detected lamp voltage Vla and the driving power Wd supplied to the discharge lamp 90.

For example, in a case where the discharge lamp 90 deteriorates and thus the lamp voltage Vla increases, the driving current I supplied to the discharge lamp 90 is reduced, and thus a bright spot in arc discharge tends to be unstable and to be moved. If the bright spot in arc discharge is moved, a melting position and a melting amount in the first electrode 92 change. Consequently, there is a concern that a shape of the first electrode 92 may become unstable and may thus be likely to wear. Therefore, there is a concern that a service life of the discharge lamp 90 may not be sufficiently improved.

Similarly, also in a case where the driving power Wd is reduced, the driving current I is reduced. For this reason, there is a concern that a bright spot in arc discharge may become unstable and thus the first electrode 92 may be likely to wear. Therefore, there is a concern that a service life of the discharge lamp 90 may not be sufficiently improved.

In relation to such problems, according to the present embodiment, the controller 40 sets the first frequency f1 on the basis of at least one of the lamp voltage Vla and the driving power Wd. Therefore, it is possible to solve at least one of the above-described problems.

Specifically, in a case where the first frequency f1 is set on the basis of the lamp voltage Vla, if the first frequency f1 is set to become higher as the lamp voltage Vla increases, a bright spot in arc discharge can be easily stabilized in a case where the discharge lamp 90 deteriorates. The reason is as follows.

In a case where a frequency of an AC current supplied to the discharge lamp 90 is relatively high, a volume of a melted portion in the protrusion 552$p$ of the first electrode 92 is relatively reduced. A bright spot in arc discharge is located on a tip surface which is planarized due to melting of the protrusion 552$p$. In a case where the volume of the melted portion in the protrusion 552$p$ is small, an area of the planarized tip surface is relatively small. Therefore, a region in which the bright spot in arc discharge is moved is reduced, and thus a position of the bright spot in arc discharge can be stabilized.

Therefore, according to the present embodiment, it is possible to prevent the first electrode 92 from easily wearing in a case where the discharge lamp 90 deteriorates.

On the other hand, in a case where the first frequency f1 is set on the basis of the driving power Wd, if the first frequency f1 is set to become higher as the driving power Wd is reduced, the first frequency f1 can be made relatively high in a case where the driving power Wd is relatively reduced. Consequently, in the same manner as described above, a bright spot in arc discharge can be stabilized, and thus it is possible to prevent the first electrode 92 from easily wearing.

As described above, according to the present embodiment, it is possible to prevent the first electrode 92 from wearing and thus to improve a service life of the discharge lamp 90.

According to the present embodiment, since the first frequency f1 is set on the basis of both of the lamp voltage Vla and the driving power Wd, it is possible to solve all of the problems. Therefore, it is possible to further improve a service life of the discharge lamp 90.

According to the present embodiment, the first frequency f1 includes a plurality of different frequencies. Thus, it is possible to vary a thermal load applied to the first electrode 92 in the first period P1. Therefore, according to the present embodiment, it is easy to make the protrusion 552$p$ of the first electrode 92 grow.

According to the present embodiment, as an AC period is provided temporally later in the first period P1, the first frequency f1 is lowered. In other words, in the first period P1, the first frequency f1 is highest in the first AC period P11 which is provided temporally earliest. In other words, among the first frequencies f1, the first frequency f11 of the AC current supplied to the discharge lamp 90 in the first AC period P11 is highest. As a frequency of an AC current supplied to the discharge lamp 90 becomes higher, the temperature of the first electrode 92 easily becomes lower.

For this reason, in the hybrid period PH1, if the first AC period P11 in which the first frequency f1 is high is provided immediately after the second period P2 in which a thermal load is larger than in the first period P1, the temperature of the first electrode 92 heated in the second period P2 can be easily rapidly reduced, and a stimulus due to variation in the thermal load can be easily applied to the first electrode 92. As a result, according to the present embodiment, it becomes easier to make the protrusion 552$p$ grow.

According to the present embodiment, the controller 40 sets the length t2 of the second period P2 on the basis of at least one of the lamp voltage Vla and the driving power Wd. Therefore, if the length t2 of the second period P2 is set to become longer as the lamp voltage Vla increases, the protrusion 552$p$ can be appropriate easily melted, and a shape of the protrusion 552$p$ can be easily maintained in a case where the discharge lamp 90 deteriorates. If the length t2 of the second period P2 is set to become shorter as the driving power Wd increases, it is possible to prevent the protrusion 552$p$ of the first electrode 92 from being excessively melted and thus to easily maintain a shape of the protrusion 552$p$.

According to the present embodiment, polarities of a DC current supplied to the discharge lamp 90 in the second period P2 of the hybrid period PH1 are inverted whenever the second period P2 is provided. Therefore, in the hybrid period PH1, it is possible to make the protrusion 552$p$ of the first electrode 92 and the protrusion 562$p$ of the second electrode 93 grow with good balance and thus to easily maintain both of a shape of the protrusion 552$p$ and a shape of the protrusion 562$p$.

The present embodiment may employ the following configurations and methods.

In the present embodiment, the hybrid period PH1 may be provided at all times while the discharge lamp 90 is being lighted, and a plurality of the hybrid periods PH1 may be provided intermittently with another period interposed therebetween.

In the present embodiment, the plurality of first frequencies f1 may be arbitrarily provided. In the present embodiment, for example, in the first period P1, there may be a configuration in which the first frequency f1 becomes higher as an AC period is provided temporally later.

In the present embodiment, the number of AC periods included in the first period P1 is not particularly limited. In the present embodiment, the first period P1 may include two or three AC periods, and may include five or more AC periods. In the present embodiment, the number of AC periods included in each first period P1 may differ.

In the present embodiment, lengths of the respective AC periods included in the first period P1 may be different from each other. In other words, the length t11 of the first AC period P11, the length t12 of the second AC period P12, the length t13 of the third AC period P13, and the length t14 of the fourth AC period P14 may be different from each other.

In the present embodiment, the controller 40 may set the first frequency f1 on the basis of only the lamp voltage Vla, and may set the first frequency f1 on the basis of only the driving power Wd.

In the present embodiment, the controller 40 may set the length t2 of the second period P2 on the basis of only the lamp voltage Vla, and may set the length t2 of the second period P2 on the basis of only the driving power Wd. In the present embodiment, the length t2 of the second period P2 need not be changed.

In the present embodiment, the controller 40 may set the length t2 of the second period P2 on the basis of at least one of the lamp voltage Vla and the driving power Wd whenever the second period P2 is provided, and may set the length t2 of the second period P2 on the basis of at least one of the lamp voltage Vla and the driving power Wd once whenever the hybrid period PH1 is provided in a case where a plurality of hybrid periods PH1 are provided. In a case where the length t2 of the second period P2 is set whenever the second period P2 is provided, lengths t2 of the second periods P2 in a single hybrid period PH1 may be different from each other. On the other hand, in a case where the length t2 of the second period P2 is set once whenever the hybrid period PH1 is provided, lengths t2 of the second periods P2 in a single hybrid period PH1 are the same as each other.

In the present embodiment, the controller 40 may set the length t2 of the second period P2 on the basis of at least one of the lamp voltage Vla and the driving power Wd once whenever a predetermined number of the hybrid periods PH1 are provided in a case where a plurality of hybrid periods PH1 are provided.

In the present embodiment, the controller 40 need not invert a polarity of a DC current supplied to the discharge lamp 90 in the second period P2 of the hybrid period PH1 whenever the second period P2 is provided. In other words, in the present embodiment, two or more second periods P2 in which a DC current with the same polarity is supplied to the discharge lamp 90 may be successively provided.

Second Embodiment

A second embodiment is different from the first embodiment in that a third period (divided DC driving period) P3 is provided. The same constituent elements as in the above-described embodiment are given the same reference numerals, and description thereof will be omitted in some cases.

In the present embodiment, the controller 40 may perform divided DC driving in addition to the above-described driving described in the first embodiment. In the present embodiment, the controller 40 controls the discharge lamp driving unit 230 so that the third period P3 which is a period for performing the divided DC driving is provided. The third period P3 is a period which is provided instead of the second period P2 under a predetermined condition.

Figure 10:
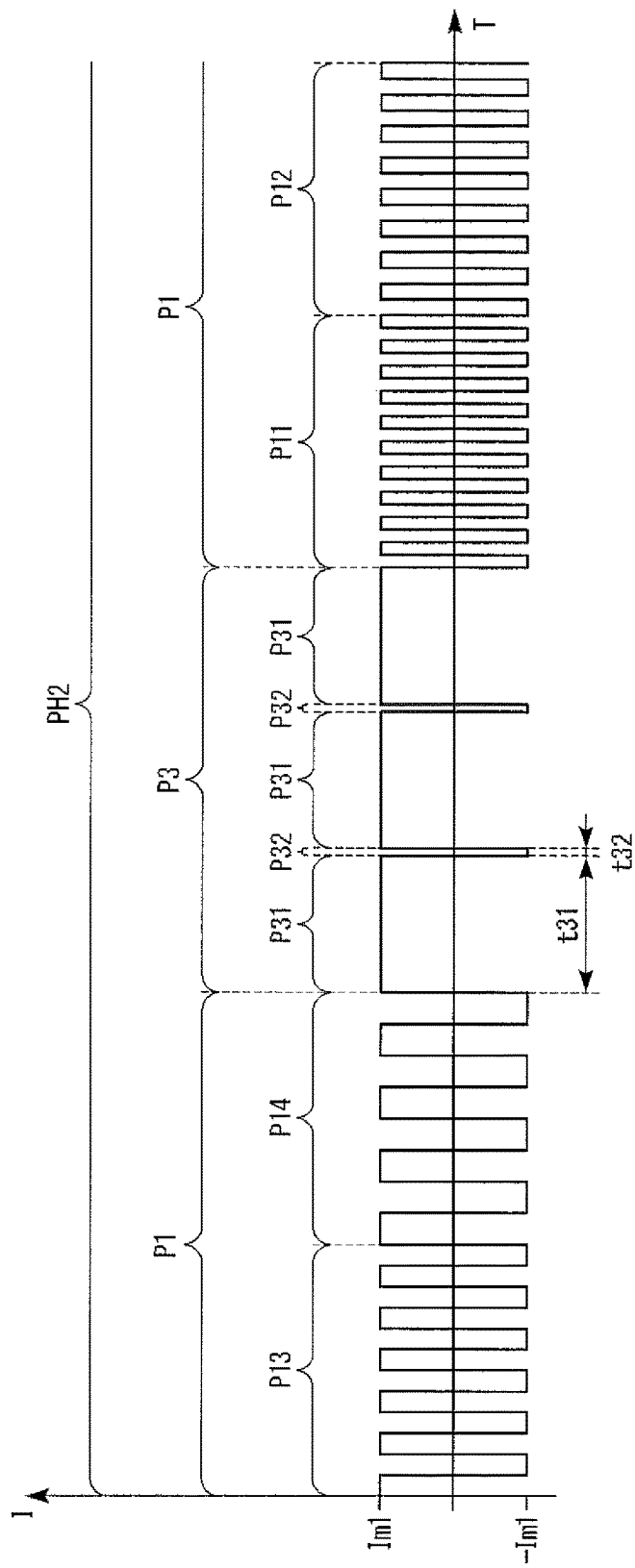
FIG. 10 is a diagram illustrating a driving current waveform in a hybrid period according to a second embodiment.

FIG. 10 is a diagram illustrating an example of a driving current waveform in the third period P3. In FIG. 10, a longitudinal axis expresses the driving current I, and a transverse axis expresses time T. The driving current I is illustrated to be positive in a case of the first polarity state, and is illustrated to be negative in a case of the second polarity state.

As illustrated in FIG. 10, in the present embodiment, a hybrid period PH2 is provided. In the hybrid period PH2, the first period P1 and the second period P2 are alternately repeated, or the first period P1 and the third period P3 are alternately repeated. In other words, in the hybrid period PH2, there is a difference in that the first period P1 and the second period P2 are alternately repeated, or the first period P1 and the third period P3 are alternately repeated, depending on a predetermined condition.

The example illustrated in FIG. 10 shows a case where the first period P1 and the third period P3 are alternately repeated in the hybrid period PH2. In a case where the first period P1 and the second period P2 are alternately repeated in the hybrid period PH2, a driving current waveform in the hybrid period PH2 is the same as the driving current waveform in the hybrid period PH1 of the first embodiment.

The third period P3 is a period in which a first DC period P31 and a second DC period P32 are alternately included. The first DC period P31 is a period in which a DC current is supplied to the discharge lamp 90. In the example illustrated in FIG. 10, in the first DC period P31, the driving current I which has the constant current value Im1 and the first polarity is supplied to the discharge lamp 90.

The second DC period P32 is a period in which a DC current with a polarity opposite to the polarity of the DC current supplied to the discharge lamp 90 in the first DC period P31 is supplied to the discharge lamp 90. In other words, in the example illustrated in FIG. 10, in the second DC period P32, the driving current I which has the constant current value −Im1 and the second polarity is supplied to the discharge lamp 90.

A polarity of the DC current supplied to the discharge lamp 90 in the first DC period P31 and a polarity of the DC current supplied to the discharge lamp 90 in the second DC period P32 are inverted whenever the third period P3 is provided. In other words, in the third period P3 provided next to the third period P3 illustrated in FIG. 10, a polarity of the DC current supplied to the discharge lamp 90 in the first DC period P31 is the second polarity, and a polarity of the DC current supplied to the discharge lamp 90 in the second DC period P32 is the first polarity.

A length t31 of the first DC period P31 is longer than a length t32 of the second DC period P32. The length t31 of the first DC period P31 is, for example, ten times or more the length t32 of the second DC period P32. If the length t31 of the first DC period P31 is set in the above-described way, in the third period P3, it is possible to appropriately heat one electrode and also to appropriately suppress the temperature of the other electrode from being too lowered.

The length t31 of the first DC period P31 is, for example, equal to or more than 5.0 ms and equal to or less than 20 ms. The length t32 of the second DC period P32 is less than 0.5 ms. A total of the lengths t31 of the first DC periods P31 in the third period P3 is longer than the length t2 of the second period P2 which is provided in a case where a predetermined condition is not satisfied.

The total of the lengths t31 of the first DC periods P31 in the third period P3 is a length obtained by adding the lengths t31 of all the first DC periods P31 included in the third period P3 together. In the example illustrated in FIG. 10, the third period P3 includes, for example, three first DC periods P31. Therefore, the total of the lengths t31 of the first DC periods P31 in the third period P3 is a length obtained by adding the lengths t31 of the three first DC periods P31.

The total of the lengths t31 of the first DC periods P31 in the third period P3 is, for example, equal to or larger than 5.0 ms and equal to or less than 100 ms. The total of the lengths t31 of the first DC periods P31 in the third period P3 is set in the above-described way, and thus it is possible to appropriately increase a thermal load applied to the protrusion 552p of the first electrode 92.

In the following description, the total of the lengths t31 of the first DC periods P31 in the third period P3 is simply referred to as a total length of the first DC periods P31 in some cases.

The lengths t31 of the first DC periods P31 may be different from or the same as each other. In the example illustrated in FIG. 10, the lengths t31 of the first DC periods P31 are the same as each other.

In the present embodiment, the controller 40 controls the discharge lamp driving unit 230 so that periods alternately repeated in the hybrid period PH2 are switched according to a predetermined condition. In other words, the controller 40 controls the discharge lamp driving unit 230 so that the third period P3 is provided instead of the second period P2 according to the predetermined condition. Details thereof will be described below.

Figure 11:
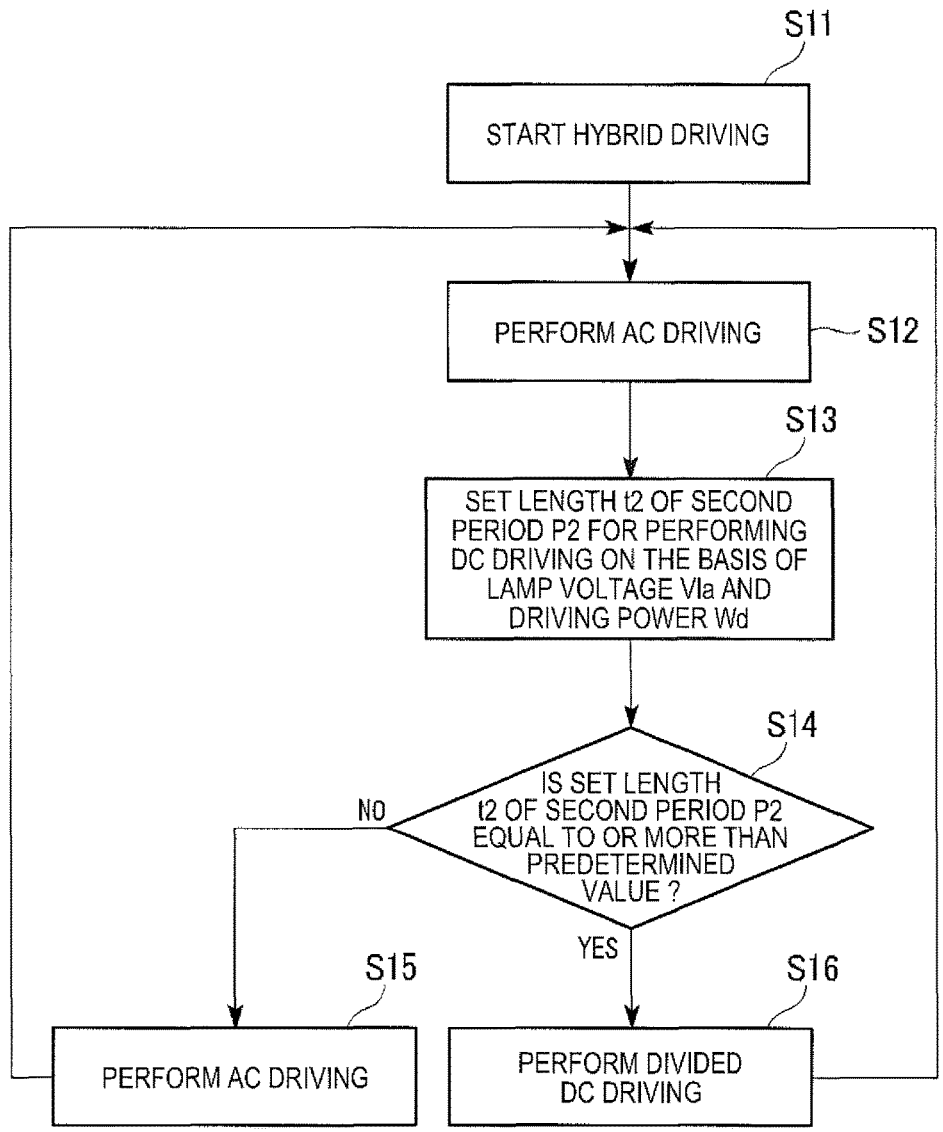
FIG. 11 is a flowchart illustrating an example of a control procedure of a discharge lamp driving unit performed by a controller according to the second embodiment.

FIG. 11 is a flowchart illustrating an example of control performed by the controller 40 in the hybrid period PH2. As illustrated in FIG. 11, the controller 40 starts hybrid driving (step S11), and then performs AC driving (step S12). Consequently, the first period P1 of the hybrid period PH2 is started.

Next, the controller 40 sets the length t2 of the second period P2 for performing DC driving on the basis of the lamp voltage Vla and the driving power Wd as described in the first embodiment (step S13). The controller 40 determines whether or not the set length t2 of the second period P2 is more than a predetermined value (step S14). In other words, in the present embodiment, the predetermined condition is whether or not the set length t2 of the second period P2 is more than the predetermined value.

In a case where the length t2 of the second period P2 is equal to or less than the predetermined value (NO in step S14), the controller 40 performs DC driving (step S15). Consequently, the second period P2 is started. In other words, in this case, a driving current waveform in the hybrid period PH2 is a waveform in which the first period P1 and the second period P2 are alternately repeated.

On the other hand, in a case where the length t2 of the second period P2 is more than the predetermined value (YES in step S14), the controller 40 performs divided DC driving (step S16). Consequently, the third period P3 is started. In other words, in this case, a driving current waveform in the hybrid period PH2 is a waveform in which the first period P1 and the third period P3 are alternately repeated. The predetermined value in step S14 is, for example, 20 ms.

As mentioned above, in the present embodiment, the controller 40 controls the discharge lamp driving unit 230 so that the third period P3 is provided instead of the second period P2 in a case where the set length t2 of the second period P2 is more than the predetermined value. In other words, in the present embodiment, if the length t2 of the second period P2 is set to be more than the predetermined value, the second period P2 is not provided. Therefore, the length t2 of the provided second period P2 is equal to or less than the predetermined value.

A total of the lengths t31 of the first DC periods P31 in the third period P3 illustrated in FIG. 10 is the same as the set length t2 of the second period P2. In other words, in a case where the set length t2 of the second period P2 is more than the predetermined value, instead of the second period P2 not being provided, a period for supplying a DC current to the discharge lamp 90 is provided to be divided into a plurality of first DC periods P31 corresponding to the set length t2. The third period P3 includes the first DC period P31 and the second DC period P32, and thus a total length of the first DC periods P31 is longer than the length t2 of the second period P2 which is provided in a case where the set length t2 of the second period P2 is equal to or less than a predetermined value.

Specifically, for example, in a case where the predetermined value is 20 ms, if the length t2 of the second period P2 is set to be more than 20 ms and equal to or less than 40 ms, the controller 40 controls the discharge lamp driving unit 230 so that the second period P2 is divided into two first DC periods P31, and the second DC period P32 is provided between the first DC periods P31. For example, if the length t2 of the second period P2 is set to be more than 40 ms and equal to or less than 60 ms, as in the example illustrated in FIG. 10, the controller 40 controls the discharge lamp driving unit 230 so that the second period P2 is divided into three first DC periods P31, and the second DC period P32 is provided between the first DC periods P31.

The example illustrated in FIG. 11 shows a configuration in which, whenever AC driving (first period P1) is performed in the hybrid period PH2, one of DC driving (second period P2) and divided DC driving (third period P3) is selected next. Therefore, there is a case where both of the second period P2 and the third period P3 are provided in a single hybrid period PH2. For example, a case is assumed in which the first period P1 and the second period P2 are alternately repeated in an initial start stage of the hybrid period PH2. In this case, if a set value of the length t2 of the second period P2 becomes more than a predetermined value due to an increase in the lamp voltage Vla on the way, a driving current waveform in the hybrid period PH2 is a waveform in which the first period P1 and the third period P3 are alternately repeated on the way.

As described above, in the present embodiment, the controller 40 determines which one of the second period P2 and the third period P3 is provided on the basis of the set length t2 of the second period P2. In the present embodiment, the length t2 of the second period P2 is set on the basis of both of the lamp voltage Vla and the driving power Wd. In other words, in the present embodiment, the controller 40 determines which one of the second period P2 and the third period P3 is provided on the basis of both of the lamp voltage Vla and the driving power Wd.

For example, in a case where the second period P2 whose length t2 is set to be more than the predetermined value is provided in the hybrid period PH2, there is a concern that the temperature of an electrode opposite to an electrode heated in the second period P2, for example, the second electrode 93 may be excessively lowered.

In contrast, according to the present embodiment, in a case where the set length t2 of the second period P2 is more than the predetermined value, instead of the second period P2, the third period P3 is provided which includes the second DC period P32 in which a DC current with a polarity opposite to a polarity of a DC current supplied to the discharge lamp 90 is supplied to the discharge lamp 90 in the first DC period P31. A total length of the first DC periods P31 in the third period P3 is the same as the set length t2 of the second period P2. Therefore, it is possible to sufficiently heat an electrode heated in the second period P2, for example, the first electrode 92 and also to prevent the temperature of the second electrode 93 opposite to the first electrode 92 from being excessively lowered.

According to the present embodiment, the total the lengths t31 of the first DC periods P31 in the third period P3 is equal to or more than 5.0 ms and equal to or less than 100 ms. Therefore, it is possible to more appropriately heat an electrode side serving as an anode in the first DC period P31.

According to the present embodiment, the total of the lengths t31 of the first DC periods P31 in the third period P3 is longer than the length t2 of the second period P2 which is provided in a case where the set length t2 of the second period P2 is equal to or less than the predetermined value. Therefore, it is possible to more heat an electrode side serving as an anode in the first DC period P31 more than in a case where the second period P2 is provided.

The present embodiment may employ the following configurations.

In the present embodiment, in a case where a plurality of hybrid periods PH2 are provided, the controller 40 may determine which one of the second period P2 and the third period P3 is provided in the hybrid period PH2, once whenever the hybrid period PH2 is provided. In this case, in a single hybrid period PH2, only the first period P1 and the second period P2 are alternately repeated, or only the first period P1 and the third period P3 are alternately repeated. In other words, in this case, in the single hybrid period PH2, only one of the second period P2 and the third period P3 is provided along with the first period P1.

In the present embodiment, in a case where a plurality of hybrid periods PH2 are provided, the controller 40 may determine which one of the second period P2 and the third period P3 is provided in the hybrid period PH2, once whenever a predetermined number of the hybrid periods PH2 are provided.

In the above-described description, the controller 40 is configured to determine which one of the second period P2 and the third period P3 is provided on the basis of the length t2 of the second period P2 which is set according to the lamp voltage Vla and the driving power Wd, but the present embodiment is not limited thereto. In the present embodiment, the controller 40 may more directly determine which one of the second period P2 and the third period P3 is provided on the basis of at least one of the lamp voltage Vla and the driving power Wd instead of determining whether or not the length t2 of the second period P2 which is set according to the lamp voltage Vla and the driving power Wd is equal to or more than a predetermined value.

In this case, the length t2 of the second period P2 need not be changed depending on the lamp voltage Vla or the driving power Wd. In other words, the controller 40 may control the discharge lamp driving unit 230 so that the third period P3 is provided instead of the second period P2 on the basis of at least one of the lamp voltage Vla and the driving power Wd. More specifically, in a case where the lamp voltage Vla is more than a predetermined value (first predetermined value), or the driving power Wd is less than a predetermined value (second predetermined value), the controller 40 may control the discharge lamp driving unit 230 so that the third period P3 is provided instead of the second period P2. In other words, in the present embodiment, the predetermined condition is whether or not the lamp voltage Vla is more than a predetermined value, or whether or not the driving power Wd is less than a predetermined value. In this case, the controller 40 sets a total of the lengths t31 of the first DC periods P31 in the third period P3, for example, on the basis of at least one of the detected lamp voltage Vla and the driving power Wd.

In the present embodiment, the controller 40 need not invert a polarity of a DC current supplied to the discharge lamp 90 in the first DC period P31 and a polarity of a DC current supplied to the discharge lamp 90 in the second DC period P32 whenever the third period P3 is provided. In other words, in the present embodiment, two or more third periods P3 in which a polarity of a DC current supplied to the discharge lamp 90 in the first DC period P31 is the same as a polarity of a DC current supplied to the discharge lamp 90 in the second DC period P32 may be successively provided.

Third Embodiment

A third embodiment is different from the first embodiment in that a fourth period (low-frequency AC driving period) P4 and a fifth period (biased driving period) P5 are provided. The same constituent elements as in the above-described embodiments are given the same reference numerals, and description thereof will be omitted in some cases.

In the present embodiment, the controller 40 may perform low-frequency AC driving and biased driving in addition to the above-described driving described in the first embodiment. In the low-frequency AC driving, an AC current with a frequency lower than a frequency of an AC current in AC driving is supplied to the discharge lamp 90. In the biased driving, DC current with different polarities are alternately supplied to the discharge lamp 90, and a length of the DC current with one polarity is sufficiently longer than a length of the DC current with the other polarity.

In the present embodiment, the controller 40 controls the discharge lamp driving unit 230 to perform a combination of four driving operations including AC driving, DC driving, low-frequency AC driving, and biased driving. In other words, in the present embodiment, the controller 40 controls the discharge lamp driving unit 230 so that the fourth period P4 in which the low-frequency AC driving is performed, and the fifth period P5 in which the biased driving is performed, are provided in addition to the hybrid period PH1 in which the first period P1 and the second period P2 are alternately repeated.

Figure 12:
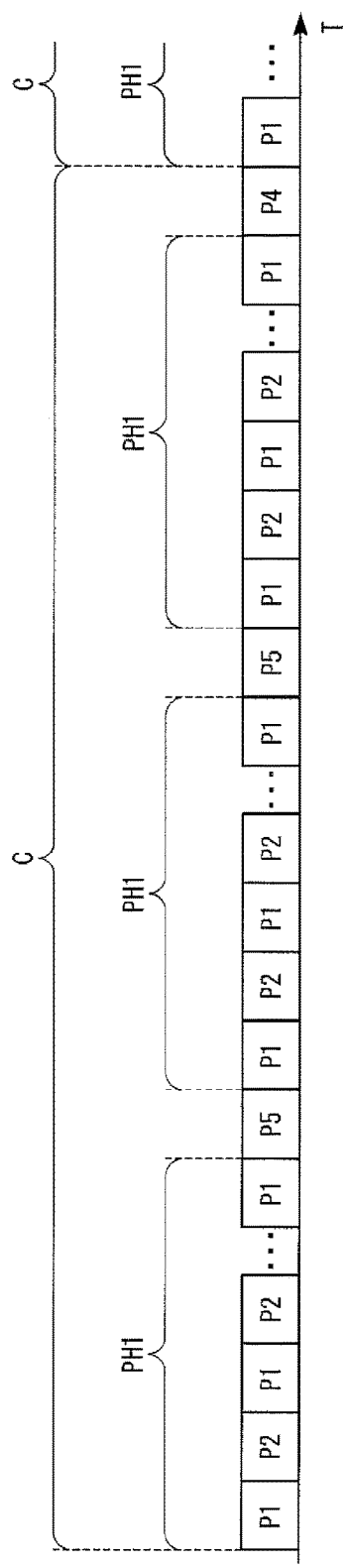
FIG. 12 is a schematic diagram illustrating changes of periods in which a driving current is supplied to a discharge lamp according to a third embodiment.

FIG. 12 is a schematic diagram illustrating changes in periods for supplying the driving current I to the discharge lamp 90 in the present embodiment. As illustrated in FIG. 12, in the present embodiment, the controller 40 controls the discharge lamp driving unit 230 so that a driving cycle C is repeated. In the present embodiment, the driving cycle C includes the first period P1, the second period P2, the fourth period P4, and the fifth period P5. In other words, the driving cycle C is executed by the controller 40 performing the four driving operations. The driving cycle C is provided with the hybrid period PH1 in which the first period P1 and the second period P2 are alternately repeated. In the present embodiment, a plurality of hybrid periods PH1 are provided.

In the present embodiment, the fourth period P4 is provided between the hybrid periods PH1 which are temporally adjacent to each other. The fourth period P4 is provided, for example, immediately after one of the first periods P1. The fourth period P4 is provided, for example, immediately before another of the first periods P1.

Here, in the same manner as in the first embodiment, a starting polarity of the first period P1 is a polarity opposite to an ending polarity of a previously provided period. Therefore, for example, in a case where an ending polarity of the fourth period P4 immediately before the first period P1 is the first polarity, the starting polarity of the first period P1 is the second polarity.

Figure 13:
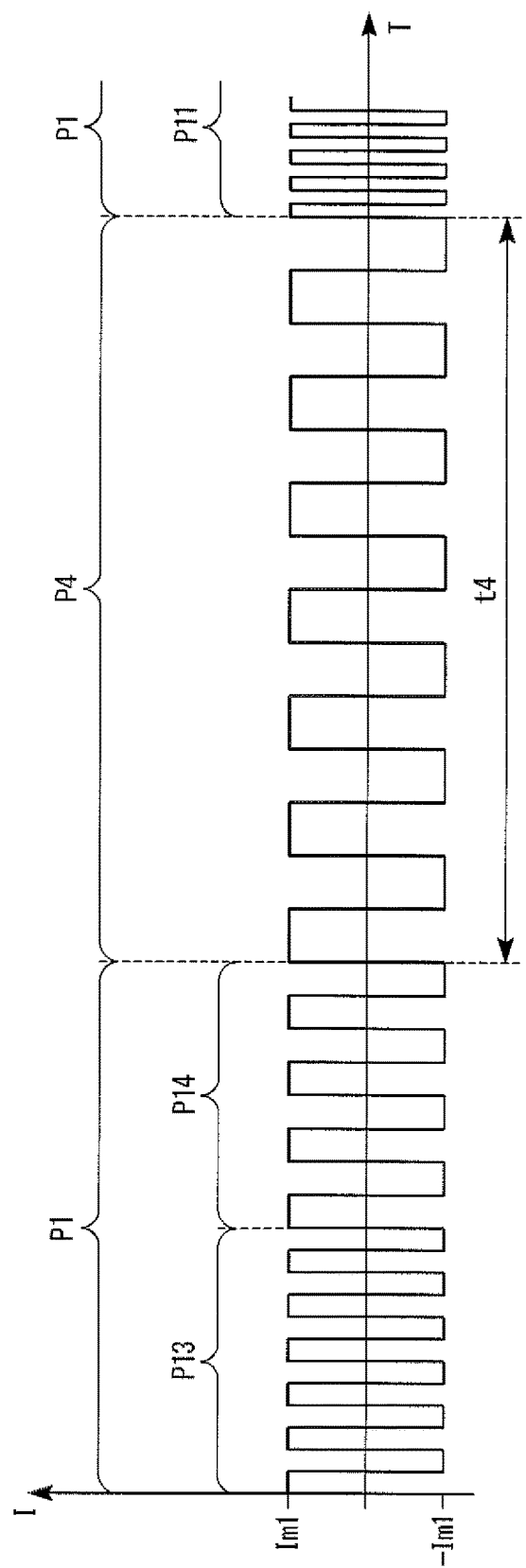
FIG. 13 is a diagram illustrating an example of a driving current waveform in a fourth period according to the third embodiment.

FIG. 13 is a diagram illustrating an example of a driving current waveform in the fourth period P4. In FIG. 13, a longitudinal axis expresses the driving current I, and a transverse axis expresses time T. The driving current I is illustrated to be positive in a case of the first polarity state, and is illustrated to be negative in a case of the second polarity state.

As illustrated in FIG. 13, the fourth period P4 is a period in which an AC current with a second frequency f2 lower than the first frequency f1 is supplied to the discharge lamp 90. In other words, the second frequency f2 with the AC current in the fourth period P4 is lower than any one of the first frequencies f11 to f14. A value of the second frequency f2 is, for example, between 10 Hz and 100 Hz.

A starting polarity of the fourth period P4 is inverted whenever the period is provided. In the example illustrated in FIG. 13, a starting polarity of the fourth period P4 is, for example, the first polarity. Therefore, a starting polarity of the next fourth period P4 which is provided after the fourth period P4 illustrated in FIG. 13 is the second polarity.

For example, a length t4 of the fourth period P4 is longer than the length t2 of the second period P2. The length t4 of the fourth period P4 is a length of 6 or more cycles of an AC current with the second frequency f2 and a length of 30 or less cycles thereof. The length t4 of the fourth period P4 is set in the above-described way, and thus a shape of the protrusion 552p of the first electrode 92 can be appropriately controlled.

As illustrated in FIG. 12, the fifth period P5 is provided between the hybrid periods PH1 which are temporally adjacent to each other. Each fifth period P5 is provided, for example, immediately after one of the first periods P1. The fifth period P5 is provided, for example, immediately before another of first periods P1.

Figure 14:
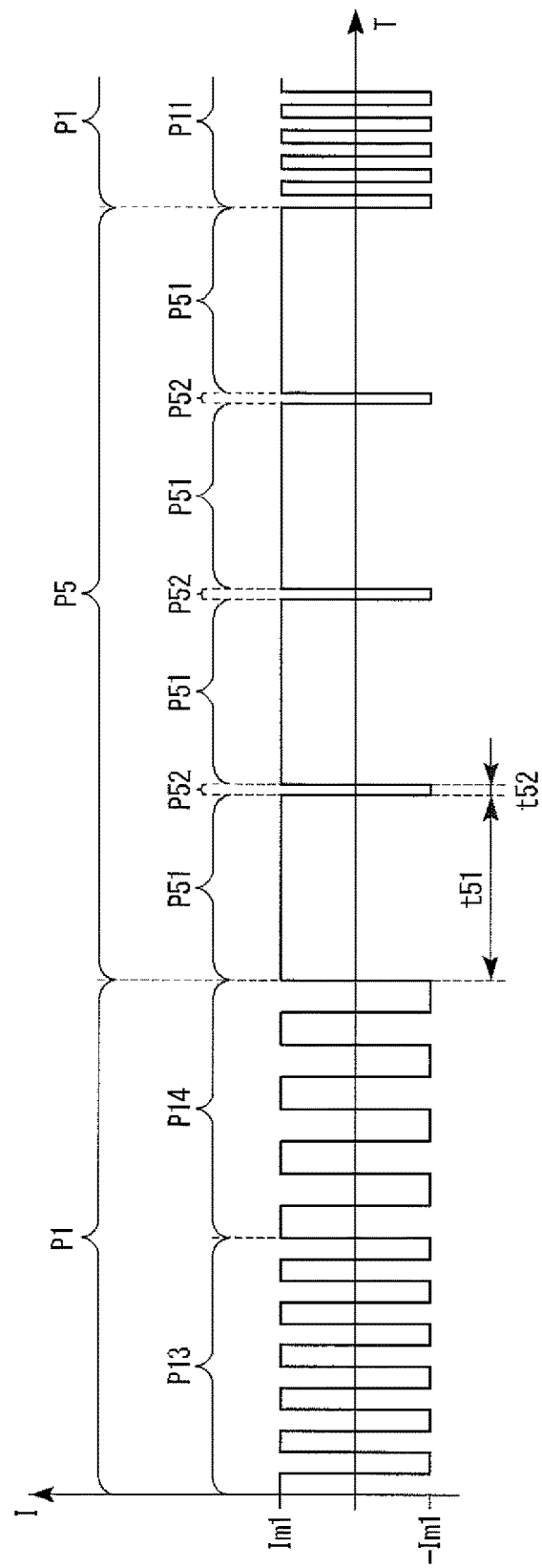
FIG. 14 is a diagram illustrating an example of a driving current waveform in a fifth period according to the third embodiment.

FIG. 14 is a diagram illustrating an example of a driving current waveform in the fifth period P5. In FIG. 14, a longitudinal axis expresses the driving current I, and a transverse axis expresses time T. The driving current I is illustrated to be positive in a case of the first polarity state, and is illustrated to be negative in a case of the second polarity state.

As illustrated in FIG. 14, the fifth period P5 is a period in which a third DC period P51 and a fourth DC period P52 are alternately included. The third DC period P51 is a period in which a DC current is supplied to the discharge lamp 90. In the example illustrated in FIG. 14, in the third DC period P51, the driving current I which has the constant current value Im1 and the first polarity is supplied to the discharge lamp 90.

The fourth DC period P52 is a period in which a DC current with a polarity opposite to the polarity of the DC current supplied to the discharge lamp 90 in the third DC period P51 is supplied to the discharge lamp 90. In other words, in the example illustrated in FIG. 14, in the fourth DC period P52, the driving current I which has the constant current value −Im1 and the second polarity is supplied to the discharge lamp 90.

A polarity of the DC current supplied to the discharge lamp 90 in the third DC period P51 and a polarity of the DC current supplied to the discharge lamp 90 in the fourth DC period P52 are inverted whenever the fifth period P5 is provided. In other words, in the next fifth period P5 provided after the fifth period P5 illustrated in FIG. 14, a polarity of the DC current supplied to the discharge lamp 90 in the third DC period P51 is the second polarity, and a polarity of the DC current supplied to the discharge lamp 90 in the fourth DC period P52 is the first polarity.

A length t51 of the third DC period P51 is longer than a length t52 of the fourth DC period P52. The length t51 of the third DC period P51 is, for example, ten times or more the length t52 of the fourth DC period P52. If the length t51 of the third DC period P51 is set in the above-described way, in the fifth period P5, it is possible to appropriately heat one electrode and also to appropriately suppress the temperature of the other electrode from being too lowered.

The length t51 of the third DC period P51 is, for example, equal to or more than 5.0 ms and equal to or less than 20 ms. The length t52 of the fourth DC period P52 is less than 0.5 ms.

A total of the lengths t51 of the third DC periods P51 in the fifth period P5 is longer than the length t2 of the second period P2, and is longer than a length of half a cycle of an AC current in the fourth period P4, that is, an AC current with the second frequency f2. The total of the lengths t51 of the third DC period P51 in the fifth period P5 is a length obtained by adding the lengths t51 of all the third DC periods P51 included in the fifth period P5. In the example illustrated in FIG. 14, the fifth period P5 includes, for example, four third DC periods P51. Therefore, the total of the lengths t51 of the third DC periods P51 in the fifth period P5 is a length obtained by adding the lengths t51 of the four third DC periods P51.

The total of the lengths t51 of the third DC period P51 in the fifth period P5 is, for example, equal to or more than 10 ms and equal to or less than 1.0 a. The total of the lengths t51 of the third DC period P51 in the fifth period P5 is set in the above-described way, and thus it is possible to appropriately increase a thermal load applied to the protrusion 552p of the first electrode 92.

In the following description, the total of the lengths t51 of the third DC period P51 in the fifth period P5 is simply referred to as a total length of the third DC periods P51 in some cases.

The lengths t51 of the third DC period P51 may be different from or the same as each other. In the example illustrated in FIG. 14, the lengths t51 of the third DC period P51 are the same as each other.

In the present embodiment, the controller 40 sets a total length of the third DC periods P51 on the basis of both of the lamp voltage Vla and the driving power Wd. In other words, in the present embodiment, the controller 40 sets the total length of the third DC periods P51 on the basis of at least one of the lamp voltage Vla and the driving power Wd. In other words, in the present embodiment, the controller 40 changes the total length of the third DC periods P51 on the basis of at least one of the lamp voltage Vla and the driving power Wd. For example, the total length of the third DC periods P51 is set to become longer as the lamp voltage Vla increases. For example, the total length of the third DC periods P51 is set to become shorter as the driving power Wd increases.

A relationship between the total length of the third DC periods P51 and the lamp voltage Vla is expressed by, for example a linear function in a case where the driving power Wd is made constant. A relationship between the total length of the third DC periods P51 and the driving power Wd is expressed by, for example, a linear function in a case where the lamp voltage Vla is made constant.

In the present specification, as the lamp voltage Vla increases, the total of lengths t51 of the third DC period P51 in the fifth period P5 may be set to become longer only in a predetermined range of values of the lamp voltage Vla, and may be set to become longer in a whole range of taken values of the lamp voltage Vla.

In the present specification, as the driving power Wd increases, the total of lengths t51 of the third DC period P51 in the fifth period P5 may be set to become shorter only in a predetermined range of values of the driving power Wd, and may be set to become shorter in a whole range of taken values of the driving power Wd.

In other words, in a case where the lamp voltage Vla is equal to or less than a predetermined value, for example, the total length of the third DC periods P51 may be constant. In a case where the driving power Wd is equal to or less than a predetermined value, for example, the total length of the third DC periods P51 may be constant.

In the present specification, the content that, as the lamp voltage Vla increases, the total of lengths t51 of the third DC period P51 in the fifth period P5 is set to become longer, includes that such setting is performed in a case where the driving power Wd is constant. In the present specification, the content that, as the driving power Wd is reduced, the total of lengths t51 of the third DC period P51 in the fifth period P5 is set to become shorter, includes that such setting is performed in a case where the lamp voltage Vla is constant.

In other words, for example, in a case where the total length of the third DC periods P51 is set on the basis of the lamp voltage Vla and the driving power Wd as in the present embodiment, an actual total length of the third DC periods P51 may be short since the driving power Wd increases even if the lamp voltage Vla increases, and an actual total length of the third DC periods P51 may be long since the lamp voltage Vla is reduced even if the driving power Wd increases.

The number of third DC periods P51 included in the fifth period P5 is defined on the basis of, for example, a total length of the third DC periods P51. The number of third DC periods P51 is defined so as to realize, for example, a set total length of the third DC periods P51 within a range in which each length t51 of the third DC period P51 is equal to or less than a predetermined value. In other words, the number of third DC periods P51 included in the fifth period P5 increases, for example, as a total length of the third DC periods P51 becomes longer.

Specifically, for example, in a case where the predetermined value for each third DC period P51 is set to 20 ms, if a total length of the third DC periods P51 is more than 20 ms and equal to or less than 40 ms, the number of third DC periods P51 included in the fifth period P5 is 2. If a total length of the third DC periods P51 is more than 40 ms and equal to or less than 60 ms, the number of third DC periods P51 included in the fifth period P5 is three.

In the example illustrated in FIG. 14, the number of third DC periods P51 included in the fifth period P5 is fourth. In other words, for example, in a case where the predetermined value is set to 20 ms, a total length of the third DC periods P51 is more than 60 ms and equal to or less than 80 ms.

With the above-described setting, it is possible to make the length t51 of the third DC period P51 equal to or less than the predetermined value (20 ms) and also to realize the set total length of the third DC periods P51.

As described above, in the present embodiment, the fourth period P4 and the fifth period P5 are provided between the hybrid periods PH1 which are temporally adjacent to each other. In the present embodiment, the fourth period P4 and the fifth period P5 are periodically provided according to a predetermined pattern. Details thereof will be described below.

Figure 15:
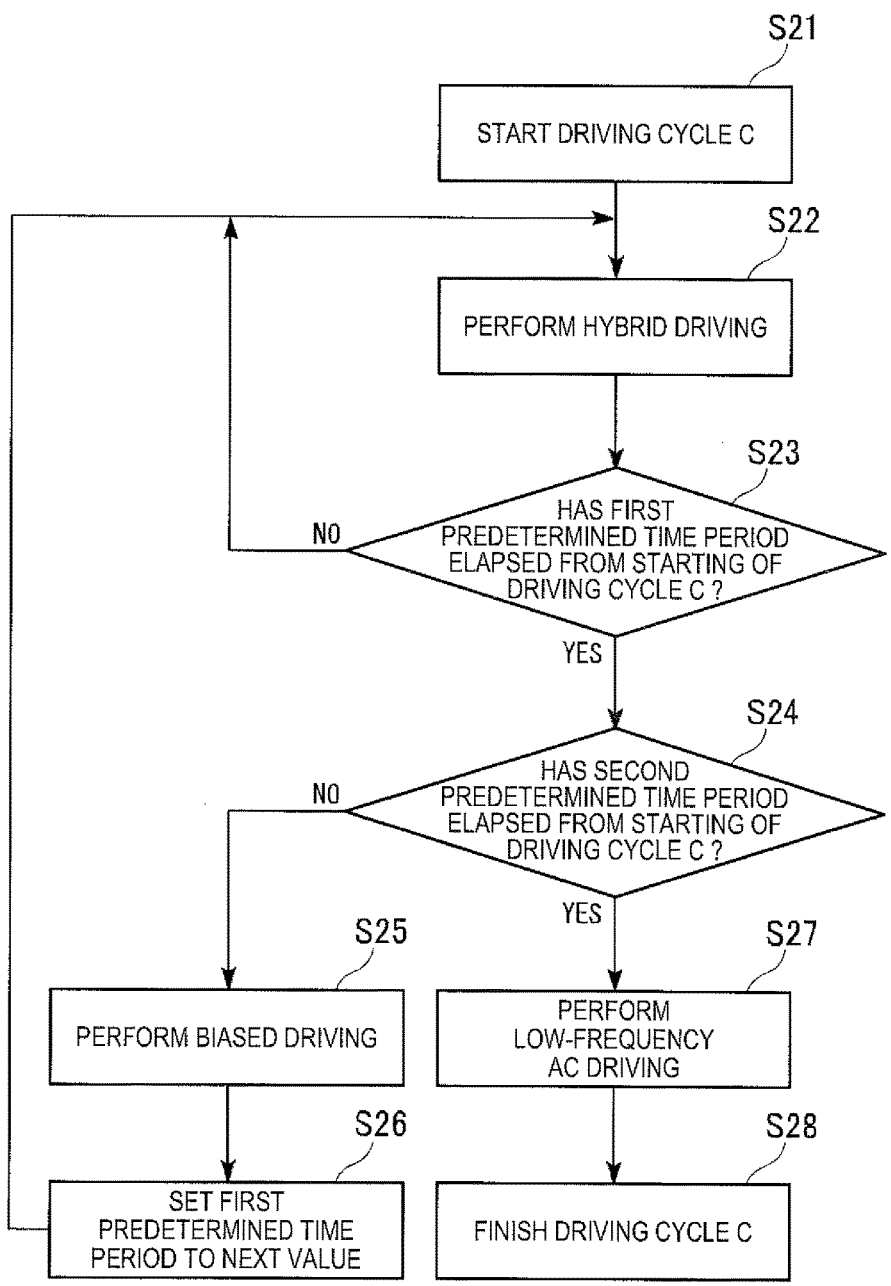
FIG. 15 is a flowchart illustrating an example of a control procedure of a discharge lamp driving unit performed by a controller according to the third embodiment.

FIG. 15 is a flowchart illustrating an example of control in the driving cycle C performed by the controller 40 according to the present embodiment. As illustrated in FIG. 15, the controller 40 starts the driving cycle C (step S21), and first executes hybrid driving (step S22). Consequently, the hybrid period PH1 is started. The controller 40 determines whether or not a first predetermined time period has elapsed from the starting of the driving cycle C (step S23).

Here, the first time period is a time period from the time point at which the driving cycle C is started to a first predetermined time point. In the present embodiment, a plurality of the first predetermined time points are set at the same intervals. Therefore, in the present embodiment, a plurality of first predetermined time periods are provided.

Specifically, in the present embodiment, the predetermined time point is set every 30 seconds (s). In other words, the first predetermined time points are, for example, time points at which 30 s, 60 s, and 90 s elapse with the time point at which the driving cycle C is started as a starting point. In other words, the first predetermined time periods are, for example, 30 s, 60 s, and 90 s. The first predetermined time period is set to an initial value (30 s) immediately after the driving cycle C is started.

In a case where the first predetermined time point has not elapsed from the starting of the driving cycle C (NO in step S23), the controller 40 continuously performs the hybrid driving. On the other hand, in a case where the first predetermined time point has elapsed from the starting of the driving cycle C (YES in step S23), the controller 40 determines whether or not a second predetermined time period has elapsed from the starting of the driving cycle C (step S24).

Here, the second predetermined time period is a time period from the time point at which the driving cycle C is started to a second predetermined time point. The second predetermined time point is, for example, a time point at which 90 s elapses with the time point at which the driving cycle C is started as a starting point. In other words, the second predetermined time period is, for example, 90 s. The second predetermined time period is more than the initial value (for example, 30 s) of the first predetermined time period.

In a case where the second predetermined time period has not elapsed from the starting of the driving cycle C (NO in step S24), the controller 40 performs biased driving (step S25). Consequently, the fifth period P5 is started. After the fifth period P5 ends, the controller 40 sets the first predetermined time period to the next value (60 s) (step S26), and performs hybrid driving again (step S22).

On the other hand, in a case where the second predetermined time period has elapsed from the starting of the driving cycle C (YES in step S24), the controller 40 performs low-frequency AC driving (step S27). Consequently, the fourth period P4 is started. After the fourth period P4 ends, the controller 40 finishes the driving cycle C (step S28). Then, the controller 40 starts the next driving cycle C (step S21).

As mentioned above, for example, in a case where the initial first predetermined time period (30 s) has elapsed from the starting of the driving cycle C, and the second first predetermined time period (60 s) has elapsed from the starting of the driving cycle C, the biased driving is performed, and thus the fifth period P5 is provided.

On the other hand, in a case where the third first predetermined time period (90 s) has elapsed from the starting of the driving cycle C, the second predetermined time period (90 s) has also elapsed, and thus the fourth period P4 is provided.

As mentioned above, the fourth period P4 and the fifth period P5 are periodically provided according to a predetermined pattern. In other words, in the present embodiment, the controller 40 controls the discharge lamp driving unit 230 so that one of the fourth period P4 and the fifth period P5 are provided at a first predetermined interval, that is, every 30 s in the above example, and the fourth period P4 is provided at a second predetermined interval, that is, every 90 s in the above example. The second predetermined interval is larger than the first predetermined interval.

In the above example, two fifth periods P5 are provided at the interval of 30 s, and then the fourth period P4 is provided. In other words, two fifth periods P5 are provided after the fourth period P4 is provided until the next fourth period P4 is provided. A polarity of a DC current supplied to the discharge lamp 90 in the third DC period P51 of the fifth period P5 and a polarity of a DC current supplied to the discharge lamp 90 in the fourth DC period P52 are inverted whenever the fifth period P5 is provided. Therefore, polarities of the driving current I supplied to the discharge lamp 90 are opposite to each other in two fifth periods P5 provided between the fourth periods P4 which are temporally adjacent to each other.

In other words, in the present embodiment, the controller 40 controls the discharge lamp driving unit 230 to provide two fifth periods P5 including the fifth period P5 in which the third DC period P51 for supplying a DC current with the first polarity to the discharge lamp 90 and the fourth DC period P52 for supplying a DC current with the second polarity to the discharge lamp 90 are alternately included, and the fifth period P5 in which the third DC period P51 for supplying a DC current with the second polarity to the discharge lamp 90 and the fourth DC period P52 for supplying a DC current with the first polarity to the discharge lamp 90 are alternately included, at the second predetermined interval at which the fourth periods P4 are provided. In other words, the two fifth periods P5 are provided in the period interposed between the fourth periods P4 which are temporally adjacent to each other.

The above-described control performed by the controller 40 may be expressed as a discharge lamp driving method. In other words, according to an aspect of the present embodiment, there is provided a discharge lamp driving method including supplying the driving current I to the discharge lamp 90 including the first electrode 92 and the second electrode 93 so as to drive the discharge lamp 90, in which the hybrid period PH1 in which the first period P1 for supplying an AC current with the first frequency f1 to the discharge lamp 90 and the second period P2 for supplying a DC current to the discharge lamp 90 are alternately repeated, the fourth period P4 in which an AC current with the second frequency f2 lower than the first frequency f1 is supplied to the discharge lamp 90, and the fifth period P5 in which the third DC period P51 for supplying a DC current to the discharge lamp 90 and the fourth DC period P52 for supplying a DC current with a polarity opposite to a polarity of the DC current supplied to the discharge lamp 90 in the third DC period P51 are alternately included, are provided, and in which the length t51 of the third DC period P51 is longer than the length t52 of the fourth DC period P52, the length t52 of the fourth DC period P52 is less than 0.5 ms, and a total of the lengths t51 of the third DC periods P51 in the fifth period P5 is longer than the length t2 of the second period P2, and is longer than a length of half a cycle of an AC current with the second frequency f2.

According to the present embodiment, in addition to the hybrid period PH1 in which the first period P1 for supplying an AC current to the discharge lamp 90 and the second period P2 for supplying a DC current to the discharge lamp 90 are alternately repeated, the fourth period P4 and the fifth period P5 are provided. In the fourth period P4, an AC current with the second frequency f2 lower than the first frequency f1 of an AC current in the first period P1 is supplied to the discharge lamp 90. Therefore, a thermal load applied to the first electrode 92 in the fourth period P4 is larger than a thermal load applied to the first electrode 92 in the first period P1.

The third DC period P51 and the fourth DC period P52 are provided in the fifth period P5. The length t51 of the third DC period P51 is longer than the length t52 of the fourth DC period P52, and the length t52 of the fourth DC period P52 is less than 0.5 ms. Therefore, in the fifth period P5, it is possible to heat an electrode side serving as an anode in the third DC period P51. In the following description, the heated electrode side is assumed to be the first electrode 92, for example.

A total length of the third DC periods P51 is longer than the length t2 of the second period P2, and is longer than a length of half a cycle of the AC current in the fourth period P4. Therefore, a thermal load applied to the first electrode 92 heated in the fifth period P5 is larger than a thermal load applied to the first electrode 92 heated in the second period P2.

As mentioned above, in the fourth period P4 and the fifth period P5, a thermal load applied to the first electrode 92 increases more than in the first period P1 or the second period P2. Therefore, the fourth period P4 and the fifth period P5 are periodically provided, and thus it is possible to vary a thermal load applied to the first electrode 92 more than in a case where only the hybrid period PH1 is provided. Consequently, it is possible to easily cause the protrusion 552p of the first electrode 92 to be melted and to grow even in a case where the discharge lamp 90 deteriorates. Therefore, according to the present embodiment, it is possible to more easily maintain a shape of the protrusion 552p and to further improve a service life of the discharge lamp 90.

Since the fourth DC period P52 (in which a DC current with a polarity opposite to a polarity of a DC current supplied to the discharge lamp 90 in the third DC period P51 is supplied to the discharge lamp 90) is provided in the fifth period P5, it is possible to prevent the temperature of the second electrode 93 on an opposite side to the first electrode 92 heated in the fifth period P5 from being excessively lowered. For example, if the temperature of the second electrode 93 is excessively lowered, there is a concern that it may be hard to heighten the temperature of the second electrode 93, and thus it may be hard to melt the protrusion 562p of the second electrode 93 when the second electrode 93 is heated so as to be melted.

Since the length t52 of the fourth DC period P52 is less than 0.5 ms, the temperature of the first electrode 92 is hardly lowered in the fourth DC period P52. Therefore, it is possible to easily appropriately heat the first electrode 92 in the third DC period P51.

Of the fourth period P4 and the fifth period P5, a thermal load applied to the first electrode 92 tends to increase more in the fifth period P5. Therefore, for example, if a period in which the fifth period P5 is periodically provided is lengthened, there is a concern that the protrusion 552p of the first electrode 92 may be excessively melted.

In contrast, according to the present embodiment, the fourth period P4 in which a thermal load applied to the first electrode 92 tends to be smaller than in the fifth period P5 is periodically provided in addition to the fifth period P5, it is possible to prevent the protrusion 552p from being excessively melted in the fifth period P5 and thus to control a shape of the protrusion 552p.

According to the present embodiment, the fifth period P5 is provided between the hybrid periods PH1 which are temporally adjacent to each other. Therefore, it is possible to easily appropriately provide the fifth period P5 in which a thermal load applied to the first electrode 92 is relatively large. Therefore, according to the present embodiment, it is possible to more easily maintain a shape of the protrusion 552$p$ and to further improve a service life of the discharge lamp 90.

Of the first period P1 and the second period P2, a thermal load applied to the first electrode 92 tends to decrease more in the first period P1. According to the present embodiment, the fifth period P5 is provided immediately after the first period P1. Therefore, it becomes easier to increase a variation in a thermal load caused by transition from the hybrid period PH1 to the fifth period P5. Thus, it becomes easier to make the protrusion 552$p$ of the first electrode 92 grow.

According to the present embodiment, the fourth period P4 is provided between the hybrid periods PH1 which are temporally adjacent to each other. Therefore, it is possible to easily provide the fourth period P4 in which a thermal load applied to the first electrode 92 is relatively large. Thus, according to the present embodiment, it is possible to more easily maintain a shape of the protrusion 552$p$, and to further improve a service life of the discharge lamp 90.

According to the present embodiment, the fourth period P4 is provided immediately after the first period P1. An AC current is supplied to the discharge lamp 90 in the first period P1 and the fourth period P4. Therefore, the periods in which an AC current is supplied to the discharge lamp 90 are continued, and a frequency is changed from the first frequency f1 to the second frequency f2 lower than the first frequency f1 when the first period P1 transitions to the fourth period P4. Consequently, compared with a case where the fourth period P4 is provided immediately after the second period P2 in which a DC current is supplied to the discharge lamp 90, it is possible to easily smoothen a variation in a thermal load applied to the first electrode 92, and to easily control a shape of the protrusion 552$p$ of the first electrode 92 in the fourth period P4.

According to the present embodiment, one of the fourth period P4 and the fifth period P5 is provided at the first predetermined interval. Therefore, it is possible to periodically increase a thermal load applied to the protrusion 552$p$ of the first electrode 92 and thus to easily appropriately maintain a shape of the protrusion 552$p$.

According to the present embodiment, the fourth period P4 is provided at the second predetermined interval larger than the first predetermined interval. Therefore, it is easy to make a frequency at which the fourth period P4 is provided lower than a frequency at which the fifth period P5 is provided. Consequently, it is possible to provide the fourth period P4 after several fifth periods P5 are provided. Thus, it is possible to appropriately melt the protrusion 552$p$ of the first electrode 92 and also to control a shape of the protrusion 552$p$.

According to the present embodiment, in the same manner as in the first embodiment, the first frequency f1 includes a plurality of different frequencies. Therefore, it is possible to vary a thermal load applied to the first electrode 92 in the first period P1. Thus, according to the present embodiment, it becomes easier to make the protrusion 552$p$ grow.

According to the present embodiment, in the same manner as in the first embodiment, as an AC period is provided temporally later in the first period P1, the first frequency f1 is lowered. In other words, in the first period P1, the first frequency f1 is highest in the first AC period P11 which is provided temporally earliest. In other words, among the first frequencies f1, the first frequency f11 of the AC current supplied to the discharge lamp 90 in the first AC period P11 is highest. As a frequency of an AC current supplied to the discharge lamp 90 becomes higher, the temperature of the first electrode 92 easily becomes lower.

For this reason, in the hybrid period PH1, if the first AC period P11 in which the first frequency f1 is high is provided immediately after the second period P2 in which a thermal load is larger than in the first period P1, the temperature of the first electrode 92 heated in the second period P2 can be easily rapidly reduced, and a stimulus due to variation in the thermal load can be easily applied to the first electrode 92. As a result, according to the present embodiment, it becomes easier to make the protrusion 552$p$ grow.

According to the present embodiment, a polarity of the DC current supplied to the discharge lamp 90 in the third DC period P51 and a polarity of the DC current supplied to the discharge lamp 90 in the fourth DC period P52 are inverted whenever the fifth period P5 is provided. Thus, it is easy to alternately heat the first electrode 92 and the second electrode 93 with good balance. Therefore, according to the present embodiment, it is possible to make the protrusion 552$p$ of the first electrode 92 and the protrusion 562$p$ of the second electrode 93 with good balance and thus to easily maintain both of a shape of the protrusion 552$p$ and a shape of the protrusion 562$p$.

According to the present embodiment, a starting polarity of the fourth period P4 is inverted whenever the period is provided. Thus, also in a case where a polarity of a DC current supplied to the discharge lamp 90 in the second period P2 and the fifth period P5 is inverted, the polarity can be inverted when a period immediately before the fourth period P4 transitions to the fourth period P4, and when the fourth period P4 transitions to a period immediately after the fourth period P4. In other words, polarities of the driving current I supplied to the discharge lamp 90 can be made opposite to each other before and after transition of the periods. Therefore, according to the present embodiment, it is possible to make the protrusion 552$p$ of the first electrode 92 and the protrusion 562$p$ of the second electrode 93 with better balance and thus to easily maintain a shape of the protrusion 552$p$ and a shape of the protrusion 562$p$.

According to the present embodiment, in the same manner as in the first embodiment, polarities of a DC current supplied to the discharge lamp 90 in the second period P2 of the hybrid period PH1 are inverted whenever the second period P2 is provided. Therefore, in the hybrid period PH1, it is possible to make the protrusion 552$p$ of the first electrode 92 and the protrusion 562$p$ of the second electrode 93 with good balance and thus to easily maintain a shape of the protrusion 552$p$ and a shape of the protrusion 562$p$.

For example, if the discharge lamp 90 deteriorates, it is hard to melt the protrusion 552$p$ of the first electrode 92 and thus it is hard to maintain a shape of the protrusion 552$p$. Thus, there is a concern that it may be hard to sufficiently maintain a shape of the protrusion 552$p$ even in the fifth period P5 in which a thermal load applied to the first electrode 92 is relatively large.

For example, in a case where the driving power Wd supplied to the discharge lamp 90 is relatively high, a thermal load applied to the first electrode 92 tends to increase. Thus, there is a concern that the thermal load applied to the first electrode 92 may excessively increase due to the provision of the fifth period P5.

In relation to such problems, according to the present embodiment, the controller 40 sets a total length of the third DC periods P51 on the basis of at least one of the lamp voltage Vla and the driving power Wd. Thus, it is possible to solve at least one of the problems.

Specifically, in a case where a total length of the third DC periods P51 is set on the basis of the lamp voltage Vla, the total length of the third DC periods P51 is set to become longer as the lamp voltage Vla increases, and thus it is possible to make a thermal load applied to the first electrode 92 in the fifth period P5 larger in a case where the discharge lamp 90 deteriorates. Consequently, in a case where the discharge lamp 90 deteriorates, it is easy to appropriately melt the protrusion 552p of the first electrode 92 in the fifth period P5 and to maintain a shape of the protrusion 552p.

On the other hand, in a case where the total length of the third DC periods P51 is set on the basis of the driving power Wd, the total length of the third DC periods P51 is set to be shorter as the driving power Wd increases, and thus it is possible to make a thermal load applied to the first electrode 92 in the fifth period P5 smaller in a case where the driving power Wd is relatively high. Consequently, it is possible to prevent the protrusion 552p of the first electrode 92 from being excessively melted and thus to easily maintain a shape of the protrusion 552p.

According to the present embodiment, the total length of the third DC periods P51 is set on the basis of both of the lamp voltage Vla and the driving power Wd, and thus all of the problems can be solved.

According to the present embodiment, in the same manner as in the first embodiment, the controller 40 sets the length t2 of the second period P2 on the basis of both of the lamp voltage Vla and the driving power Wd. For this reason, if the length t2 of the second period P2 is set to become longer as the lamp voltage Vla increases, it is easy to appropriately melt the protrusion 552p and to maintain a shape of the protrusion 552p in a case where the discharge lamp 90 deteriorates. If the length t2 of the second period P2 is set to become shorter as the driving power Wd increases, it is possible to prevent the protrusion 552p of the first electrode 92 from being excessively melted and thus to easily maintain a shape of the protrusion 552p.

For example, if a difference (ratio) between a length t51 of the third DC period P51 and a length t52 of the fourth DC period P52 is small in the fifth period P5, a difference between an increase range of the temperature of the first electrode 92 in the third DC period P51 and a decrease range of the temperature of the first electrode 92 in the fourth DC period P52 is small. Thus, it is hard to increase the temperature of the first electrode 92 in the fifth period P5. Consequently, there is a concern that a thermal load applied to the first electrode 92 may not be sufficiently increased in the fifth period P5, and the protrusion 552p may not be sufficiently melted.

In contrast, according to the present embodiment, the length t51 of the third DC period P51 is ten times or more the length t52 of the fourth DC period P52. Therefore, it is possible to make an increase range of the temperature of the first electrode 92 in the third DC period P51 sufficiently larger than a decrease range of the temperature of the first electrode 92 in the fourth DC period P52. Consequently, according to the present embodiment, it is possible to appropriately apply a thermal load to the first electrode 92 in the fifth period P5 and thus to more easily maintain a shape of the protrusion 552p.

According to the present embodiment, a total of lengths t51 of the third DC periods P51 in the fifth period P5 is equal to or larger than 10 ms and equal to or smaller than 1.0 s. Thus, it is possible to appropriately apply a thermal load to the first electrode 92 in the fifth period P5 and thus to more easily maintain a shape of the protrusion 552p.

According to the present embodiment, the length t4 of the fourth period P4 is a length of 6 or more cycles of an AC current with the second frequency f2 supplied to the discharge lamp 90 in the fourth period P4 and a length of 30 or less cycles thereof. Thus, a shape of the protrusion 552p of the first electrode 92 can be more appropriately controlled in the fourth period P4.

According to the present embodiment, in the same manner as in the first embodiment, the controller 40 sets the first frequency f1 on the basis of at least one of the lamp voltage Vla and the driving power Wd. Therefore, as described above, it is possible to prevent the first electrode 92 from easily wearing in a case where the discharge lamp 90 deteriorates.

The present embodiment may employ the following configurations and methods.

In the present embodiment, the first period P1, the second period P2, the fourth period P4, and the fifth period P5 may be arbitrarily provided in a range in which the hybrid period PH1 is provided. For example, in the above description, only a case where the first period P1 and the second period P2 are alternately continuously provided in the hybrid period PH1 has been described, but the first period P1 and the second period P2 are not limited thereto and may be provided separately from each other. For example, the second period P2 and the fourth period P4, the second period P2 and the fifth period P5, and the fourth period P4 and the fifth period P5 may be respectively continuously provided.

In the present embodiment, the fourth period P4 and the fifth period P5 provided between the hybrid periods PH1 which are temporally adjacent to each other may be provided immediately after the second period P2.

In the above description, an ending polarity of a certain period is configured to be different from a polarity of a starting polarity of a period provided immediately after the certain period, but the present embodiment is not limited thereto. In the present embodiment, an ending polarity of a certain period may be the same as a polarity of a starting polarity of a period provided immediately after the certain period.

In the present embodiment, the controller 40 may set a total length of the third DC periods P51 in the fifth period P5 on the basis of only the lamp voltage Vla, and may set a total length of the third DC periods P51 in the fifth period P5 on the basis of only the driving power Wd. In the present embodiment, a total length of the third DC periods P51 in the fifth period P5 need not be changed.

In the present embodiment, the controller 40 may set the length t4 of the fourth period P4 on the basis of at least one of the lamp voltage Vla and the driving power Wd in the same manner as the total length of the third DC periods P51 in the fifth period P5, and the length t2 of the second period P2. In other words, in the present embodiment, the controller 40 may change the length t4 of the fourth period P4 on the basis of at least one of the lamp voltage Vla and the driving power Wd.

In the present embodiment, the hybrid period PH2 of the second embodiment may be provided instead of the hybrid period PH1. In this case, a total of the lengths t31 of the first DC periods P31 in the third period P3 of the hybrid period PH2 is shorter than a total of the lengths t51 of the third DC periods P51 in the fifth period P5. In other words, a total length of the third DC periods P51 in the fifth period P5 is longer than a total length of the first DC periods P31 in the third period P3 of the hybrid period PH2.

In the present embodiment, the controller 40 need not invert a starting polarity of the fourth period P4 whenever the fourth period P4 is provided. In other words, in the present embodiment, two or more fourth periods P4 in which an AC current with the same starting polarity and the second frequency f2 is supplied to the discharge lamp 90 may be successively provided.

In the present embodiment, the controller 40 need not invert a polarity of the DC current supplied to the discharge lamp 90 in the third DC period P51 and a polarity of the DC current supplied to the discharge lamp 90 in the fourth DC period P52 whenever the fifth period P5 is provided. In other words, in the present embodiment, two or more fifth periods P5 in which a polarity of a DC current supplied to the discharge lamp 90 in the third DC period P51 is the same as a polarity of a DC current supplied to the discharge lamp 90 in the fourth DC period P52 may be successively provided.

In the same manner as in the first embodiment, the controller 40 may set the length t2 of the second period P2 on the basis of only the lamp voltage Vla, and may set the length t2 of the second period P2 on the basis of only the driving power Wd. In the present embodiment, the length t2 of the second period P2 need not be changed.

In the same manner as in the first embodiment, the controller 40 may set the length t2 of the second period P2 on the basis of at least one of the lamp voltage Vla and the driving power Wd whenever the second period P2 is provided, and may set the length t2 of the second period P2 on the basis of at least one of the lamp voltage Vla and the driving power Wd once whenever the hybrid period PH1 is provided. In a case where the length t2 of the second period P2 is set whenever the second period P2 is provided, lengths t2 of the second periods P2 in a single hybrid period PH1 may be different from each other. On the other hand, in a case where the length t2 of the second period P2 is set once whenever the hybrid period PH1 is provided, lengths t2 of the second periods P2 in a single hybrid period PH1 are the same as each other.

In the same manner as in the first embodiment, the controller 40 may set the length t2 of the second period P2 on the basis of at least one of the lamp voltage Vla and the driving power Wd once whenever a predetermined number of the hybrid periods PH1 are provided.

In the same manner as in the first embodiment, the controller 40 need not invert a polarity of a DC current supplied to the discharge lamp 90 in the second period P2 of the hybrid period PH1 whenever the second period P2 is provided. In other words, in the present embodiment, two or more second periods P2 in which a DC current with the same polarity is supplied to the discharge lamp 90 may be successively provided.

In the same manner as in the first embodiment, a plurality of first frequencies f1 may be arbitrarily provided. For example, in the first period P1, there may be a configuration in which the first frequency f1 becomes higher as an AC period is provided temporally later.

In the same manner as in the first embodiment, lengths of the respective AC periods included in the first period P1 may be different from each other. In other words, the length t11 of the first AC period P11, the length t12 of the second AC period P12, the length t13 of the third AC period P13, and the length t14 of the fourth AC period P14 may be different from each other.

In the present embodiment, the first frequency f1 may be formed of only a single frequency. In other words, in the present embodiment, only one type of AC period may be provided in the first period P1.

In the present embodiment, the controller 40 may set the first frequency f1 on the basis of only the lamp voltage Vla, and may set the first frequency f1 on the basis of only the driving power Wd. In the present embodiment, the first frequency f1 need not be changed.

In the respective embodiments, a description has been made of an example of a case where the invention is applied to the transmissive projector, but the invention is applicable to a reflective projector. Here, the term "transmissive" indicates a type in which a liquid crystal light valve including a liquid crystal panel or the like transmits light therethrough. The term "reflective" indicates a type in which the liquid crystal light valve reflects light. A light modulation device is not limited to a liquid crystal panel or the like, and may be a light modulation device using, for example, a micro-mirror.

In the respective embodiments, a description has been made of an example of the projector 500 using the three liquid crystal panels 560R, 560G and 560B (the liquid crystal light valves 330R, 330G and 330B), but the invention is applicable to a projector using only a single liquid crystal panel, and to a projector using four or more liquid crystal panels.

The configurations of the first to third embodiments may be combined with each other as appropriate so as not to cause contradiction therebetween.

The entire disclosure of Japanese Patent Application No.: 2015-094122, filed May 1, 2015 and 2015-101765, filed May 19, 2015 are expressly incorporated by reference herein.

What is claimed is:

1. A discharge lamp driving device comprising:
   a discharge lamp driving unit configured to supply a driving current to a discharge lamp including electrodes;
   a controller configured to control the discharge lamp driving unit; and
   a voltage detection unit configured to detect an inter-electrode voltage of the discharge lamp,
   wherein the controller controls the discharge lamp driving unit so that the driving current includes a hybrid period in which a first period for supplying an AC current with a first frequency to the discharge lamp and a second period for supplying a DC current to the discharge lamp are alternately repeated,
   wherein the first frequency includes a plurality of different frequencies, and
   wherein the controller changes the first frequency on the basis of at least one of the detected inter-electrode voltage and driving power supplied to the discharge lamp.

2. The discharge lamp driving device according to claim 1,
   wherein the controller sets the first frequency on the basis of the detected inter-electrode voltage, and
   wherein the first frequency is set to become higher as the inter-electrode voltage increases.

3. The discharge lamp driving device according to claim 1,
   wherein the controller sets the first frequency on the basis of the driving power, and
   wherein the first frequency is set to become higher as the driving power is reduced.

4. The discharge lamp driving device according to claim 1,
   wherein the first period includes a plurality of AC periods in which frequencies of the AC current supplied to the discharge lamp are different from each other, and wherein the frequency of the AC current in the AC period becomes lower as the AC period is provided temporally later in the first period.

5. The discharge lamp driving device according to claim 1,
wherein the controller changes a length of the second period on the basis of at least one of the detected inter-electrode voltage and the driving power.

6. The discharge lamp driving device according to claim 1,
wherein, in a case where the detected inter-electrode voltage is higher than a first predetermined value, or the driving power supplied to the discharge lamp is lower than a second predetermined value, the controller controls the discharge lamp driving unit so that a third period is provided instead of the second period,
wherein the third period alternately includes a first DC period in which a DC current is supplied to the discharge lamp, and a second DC period in which a DC current with a polarity opposite to a polarity of the DC current supplied to the discharge lamp in the first DC period is supplied to the discharge lamp,
wherein a length of the first DC period is longer than a length of the second DC period, and
wherein the length of the second DC period is less than 0.5 ms.

7. A discharge lamp driving device comprising:
a discharge lamp driving unit configured to supply a driving current to a discharge lamp including electrodes; and
a controller configured to control the discharge lamp driving unit,
wherein the controller controls the discharge lamp driving unit to provide
a hybrid period in which a first period for supplying an AC current with a first frequency to the discharge lamp and a second period for supplying a DC current to the discharge lamp are alternately repeated,
a fourth period in which an AC current with a second frequency lower than the first frequency is supplied to the discharge lamp, and
a fifth period alternately including a third DC period in which a DC current is supplied to the discharge lamp, and a fourth DC period in which a DC current with a polarity opposite to a polarity of the DC current supplied to the discharge lamp in the third DC period is supplied to the discharge lamp,
wherein a length of the third DC period is longer than a length of the fourth DC period,
wherein the length of the fourth DC period is less than 0.5 ms, and
wherein a total of lengths of the third DC periods in the fifth period is longer than a length of the second period, and is longer than a length of half a cycle of the AC current with the second frequency in the fourth period.

8. The discharge lamp driving device according to claim 7,
wherein the length of the third DC period is ten times or more the length of the fourth period.

9. The discharge lamp driving device according to claim 7,
wherein the total of the lengths of the third DC periods in the fifth period is equal to or larger than 10 ms and equal to or less than 1.0 s.

10. The discharge lamp driving device according to claim 7,
wherein a plurality of the hybrid periods are provided, and wherein the fifth period is provided between the hybrid periods which are temporally adjacent to each other, and is provided immediately after the first period.

11. The discharge lamp driving device according to claim 7,
wherein a plurality of the hybrid periods are provided, and
wherein the fourth period is provided between the hybrid periods which are temporally adjacent to each other, and is provided immediately after the first period.

12. The discharge lamp driving device according to claim 7,
wherein the controller controls the discharge lamp driving unit so that one of the fourth period and the fifth period is provided at a first predetermined interval.

13. The discharge lamp driving device according to claim 12,
wherein the controller controls the discharge lamp driving unit so that the fourth period is provided at a second predetermined interval larger than the first predetermined interval.

14. The discharge lamp driving device according to claim 13,
wherein the controller controls the discharge lamp driving unit to provide, in the second predetermined interval,
the fifth period alternately including the third DC period in which a DC current with a first polarity is supplied to the discharge lamp, and the fourth DC period in which a DC current with a second polarity is supplied to the discharge lamp, and
the fifth period alternately including the third DC period in which a DC current with the second polarity is supplied to the discharge lamp, and the fourth DC period in which a DC current with the first polarity is supplied to the discharge lamp.

15. The discharge lamp driving device according to claim 7,
wherein the first frequency includes a plurality of different frequencies.

16. The discharge lamp driving device according to claim 15,
wherein the first period includes a plurality of AC periods in which frequencies of the AC current supplied to the discharge lamp are different from each other, and
wherein the frequency of the AC current in the AC period becomes lower as the AC period is provided temporally later in the first period.

17. The discharge lamp driving device according to claim 7,
wherein a polarity of the DC current supplied to the discharge lamp in the third DC period and a polarity of the DC current supplied to the discharge lamp in the fourth DC period are inverted whenever the fifth period is provided.

18. The discharge lamp driving device according to claim 7,
wherein a starting polarity of the fourth period is inverted whenever the fourth period is provided.

19. The discharge lamp driving device according to claim 7,
wherein a polarity of the DC current supplied to the discharge lamp in the second period of the hybrid period is inverted whenever the second period is provided.

20. The discharge lamp driving device according to claim 7, further comprising:
a voltage detection unit configured to detect an inter-electrode voltage of the discharge lamp, wherein the controller changes the total of lengths of the third DC periods in the fifth period on the basis of at least one of the detected inter-electrode voltage and driving power supplied to the discharge lamp.

21. The discharge lamp driving device according to claim 20,
wherein the controller sets the total of the lengths of the third DC periods in the fifth period on the basis of the detected inter-electrode voltage, and
wherein the total of the lengths of the third DC periods in the fifth period is set to become longer as the inter-electrode voltage increases.

22. The discharge lamp driving device according to claim 20,
wherein the controller sets the total of the lengths of the third DC periods in the fifth period on the basis of the driving power, and
wherein the total of the lengths of the third DC periods in the fifth period is set to become shorter as the driving power increases.

23. The discharge lamp driving device according to claim 7, further comprising:
a voltage detection unit configured to detect an inter-electrode voltage of the discharge lamp,
wherein the controller changes a length of the second period on the basis of at least one of the detected inter-electrode voltage and driving power supplied to the discharge lamp.

24. The discharge lamp driving device according to claim 7, further comprising:
a voltage detection unit configured to detect an inter-electrode voltage of the discharge lamp,
wherein, in a case where the detected inter-electrode voltage is higher than a first predetermined value, or the driving power supplied to the discharge lamp is lower than a second predetermined value, the controller controls the discharge lamp driving unit so that a third period is provided instead of the second period,
wherein the third period alternately includes a first DC period in which a DC current is supplied to the discharge lamp, and a second DC period in which a DC current with a polarity opposite to a polarity of the DC current supplied to the discharge lamp in the first DC period is supplied to the discharge lamp,
wherein a length of the first DC period is longer than a length of the second DC period,
wherein the length of the second DC period is less than 0.5 ms, and wherein the total of lengths of the third DC periods in the fifth period is longer than a total of lengths of the first DC periods in the third period.

25. The discharge lamp driving device according to claim 24,
wherein the total of the lengths of the first DC periods in the third period is equal to or larger than 5.0 ms and equal to or less than 100 ms.

26. The discharge lamp driving device according to claim 7,
wherein the length of the fourth period is a length of 6 or more cycles and 30 or less cycles of the AC current with the second frequency.

27. A projector comprising:
a discharge lamp configured to emit light;
the discharge lamp driving device according to claim 7;
a light modulation device configured to modulate light emitted from the discharge lamp according to an image signal; and
a projection optical system configured to project light modulated by the light modulation device.

28. A discharge lamp driving method for supplying a driving current to a discharge lamp including electrodes and driving the discharge lamp, the method comprising:
supplying the driving current including
a hybrid period in which a first period for supplying an AC current with a first frequency to the discharge lamp and a second period for supplying a DC current to the discharge lamp are alternately repeated,
a fourth period in which an AC current with a second frequency lower than the first frequency is supplied to the discharge lamp, and
a fifth period in which a third DC period in which a DC current is supplied to the discharge lamp, and a fourth DC period in which a DC current with a polarity opposite to a polarity of the DC current supplied to the discharge lamp in the third DC period is supplied to the discharge lamp, are alternately included,
wherein a length of the third DC period is longer than a length of the fourth DC period,
wherein the length of the fourth DC period is less than 0.5 ms, and
wherein a total of lengths of the third DC periods in the fifth period is longer than a length of the second period, and is longer than a length of half a cycle of the AC current with the second frequency in the fourth period.

* * * * *